(12) United States Patent
Yu et al.

(10) Patent No.: US 8,422,512 B2
(45) Date of Patent: Apr. 16, 2013

(54) METHOD AND SYSTEM FOR AN EXTENDED RANGE ETHERNET LINE CODE

(75) Inventors: Xinhua Yu, San Jose, CA (US); Kuang-Chou Chang, San Jose, CA (US); Yencheng Chen, Fremont, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 435 days.

(21) Appl. No.: 12/824,012

(22) Filed: Jun. 25, 2010

(65) Prior Publication Data

US 2010/0260201 A1 Oct. 14, 2010

Related U.S. Application Data

(63) Continuation of application No. 11/686,852, filed on Mar. 15, 2007, now Pat. No. 7,835,389.

(60) Provisional application No. 60/826,348, filed on Sep. 20, 2006.

(51) Int. Cl.
*H03M 7/00* (2006.01)

(52) U.S. Cl.
USPC .......................................... 370/465; 341/51

(58) Field of Classification Search .................. 370/465; 341/51
See application file for complete search history.

(56) References Cited

U.S. PATENT DOCUMENTS

| 5,579,323 A | 11/1996 | Krisher | |
|---|---|---|---|
| 5,633,631 A * | 5/1997 | Teckman | 341/58 |
| 5,664,108 A * | 9/1997 | Heaton et al. | 709/252 |
| 5,673,254 A | 9/1997 | Crayford | |
| 5,856,980 A | 1/1999 | Doyle | |
| 6,504,849 B1 | 1/2003 | Wang et al. | |
| 6,522,271 B2 | 2/2003 | Calvignac | |
| 7,519,101 B1 * | 4/2009 | Wright | 375/140 |
| 7,602,806 B2 | 10/2009 | Yang | |
| 2002/0025010 A1 * | 2/2002 | Yamazaki | 375/342 |
| 2004/0008794 A1 * | 1/2004 | McClellan | 375/260 |
| 2004/0085937 A1 * | 5/2004 | Noda | 370/335 |
| 2005/0047430 A1 | 3/2005 | Moat | |
| 2005/0135413 A1 | 6/2005 | Yang et al. | |

FOREIGN PATENT DOCUMENTS

CN 1118960 A 3/1996

\* cited by examiner

*Primary Examiner* — Brian D Nguyen

(74) *Attorney, Agent, or Firm* — Farjami & Farjami LLP

(57) ABSTRACT

Aspects of a method and system for an extended range Ethernet line code are provided. One or more ternary encoded bitstreams may be generated and transmitted. The generating may comprise mapping 3-bit binary IDLE patterns having a least significant bit of zero to a non-zero ternary value, and mapping 3-bit binary IDLE patterns having a non-zero least significant bit to a ternary zero. The generating may comprise receiving binary data via a media independent interface, mapping each 4-bit portion of said received binary data to a ternary symbol comprising two ternary bits, and transmitting said ternary symbol over said one or more physical channels. Data portions of the one or more ternary encoded bitstreams may be generated by mapping 3-bit binary patterns to 2-bit ternary symbols. One of the nine possible 2-bit ternary symbols may be reserved for control portions of said one or more ternary encoded bitstreams.

22 Claims, 13 Drawing Sheets

METHOD AND SYSTEM FOR AN EXTENDED RANGE ETHERNET LINE CODE

CROSS-REFERENCE TO RELATED APPLICATIONS/INCORPORATION BY REFERENCE

This patent application is a continuation of U.S. patent application Ser. No. 11/686,852 filed on Mar. 15, 2007, now U.S. Pat. No. 7,835,389, which, in turn, makes reference to, claims priority to and claims benefit from U.S. Provisional Patent Application Ser. No. 60/826,348 filed on Sep. 20, 2006.

Each of the above stated applications is hereby incorporated by reference in its entirety.

FIELD OF THE INVENTION

Certain embodiments of the invention relate to high-speed wired communication. More specifically, certain embodiments of the invention relate to a method and system for an extended range Ethernet line code.

BACKGROUND OF THE INVENTION

As the number of devices connected to data networks increase and higher data rates are required, there is a growing need for new transmission technologies enabling higher transmission rates over existing copper cabling infrastructures. Various efforts exist in this regard, including technologies that enable transmission rates that may even exceed Gigabits-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. However, connections longer than 100 m may require either the use of fiber or the placement of Ethernet switches, hubs, and/or repeaters, at mid-points in the connection to keep all cables less than 100 m in length.

Other efforts include the development of a standard for 10 Gigabits-per-second (Gbps) Ethernet transmission over twisted-pair cabling (10GBASE-T). The emerging 10GBASE-T PHY specification is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. Moreover, new cabling specifications are being developed to diminish susceptibility to external electro-magnetic interferences.

Extending the range or distance at which standard based Ethernet PHY devices may operate with minimal changes to the PHY transceiver architectures that support, for example, 1 Gbps or 10 Gbps data rates, may enable new Ethernet PHY devices to be used and deployed in the broadband access market and possibly in new residential and enterprise applications. Moreover, features may be provided that may enable a single PHY device to operate in either a standard or an extended range mode of operation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an extended range Ethernet line code, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an extended range Ethernet line code. Aspects of the invention may comprise a local PHY that may enable converting Ethernet media independent interface (MII) data from a 4-bit packet stream to a 3-bit packet stream. The 3-bit packet stream may be mapped to first and second ternary bits streams for communication to a remote PHY utilizing PAM-3 over one or more twisted-pair wires. For example, PAM-3 may be utilized in systems that support one or two twisted-pair wires. The 3-bit packet stream may be scrambled and/or aligned before mapping. When a single twisted-pair wire is available, the local PHY may multiplexing the ternary bits streams into a single stream. Start-stream delimiters (SSD) may be inserted before the ternary bits streams and end-stream delimiters may be inserted after the ternary bits streams. Idle signals may be inserted after the ESDs and before the start of the next frame of MII data.

For extended range applications, the Ethernet line code may operate so as to slow down the line rate in order to support longer or extended cable ranges. In this regard, the redundancy of the line codes may be minimized in order to extend the ranges of operation. For example, utilizing a PAM-3 scheme for transmission over each wire pair may enable the appropriate level of redundancy and signal-to-noise ratio (SNR). The PAM-3 symbols utilized for extending the range of Ethernet applications may be considered as ternary bits. The Ethernet line code transmit data flow may begin from a 4-bit MII data stream which may be re-formatted into a 3-bit binary data stream (4b3b) and further converted to 2 ternary bit (3b2t) streams. The 2 ternary bit streams may represent 9 possible values where only 8 values may be sufficient to represent the 3-bit binary data. In this regard, the redundant $9^{th}$ value in the ternary bits representation may be utilized in start and/or end of stream control codes and may also be utilized to indicate transmit error. The $9^{th}$ value in the ternary bit representation may also be utilized to resolve the ordering of ternary symbol stream over a single twisted-pair wire connection. Between MII data frames, special IDLE code groups may be inserted where the IDLE encoding may also be utilized to indicate the reliability of the local PHY to a remote link partner. The IDLE code may be followed by a data frame that may begin with an SSD and may end with an ESD. Specially coded ESDs may be utilized for signaling a transmit error during transmission of a data stream.

Figure 1:
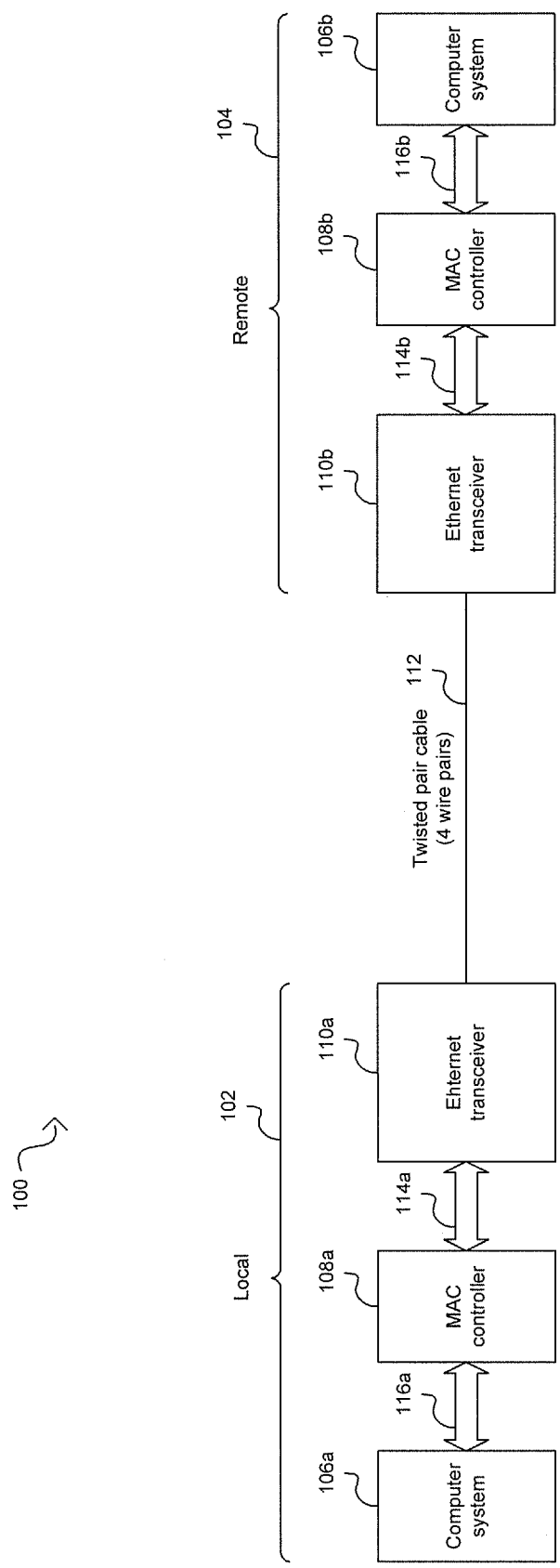
FIG. 1 is a block diagram illustrating an Ethernet over twisted-pair cabling link between a local link partner and a remote link partner, in connection with an embodiment of the invention.

FIG. 1 is a block diagram illustrating an Ethernet over twisted-pair cabling link between a local link partner and a remote link partner, in connection with an embodiment of the invention. Referring to FIG. 1, there is shown a system 100 that comprises a local link partner 102 and a remote link partner 104. The local link partner 102 and the remote link partner 104 communicate via a cable 112. The cable 112 may comprise up to four unshielded twisted-pairs (UTP) of copper cabling or wires, for example. The local link partner 102 and the remote link partner 104 may communicate via one or more twisted-pair wires comprised within the cable 112. Certain performance and/or specifications criteria for UTP copper cabling have been standardized. For example, Category 3 cabling may provide the necessary performance for 10 Mbps Ethernet transmissions over twisted-pair cabling (10BASE-T). In another example, Category 5 cabling may provide the necessary performance for 1000 Mbps, or Gbps, Ethernet transmissions over twisted-pair cabling (1000BASE-T). In most instances, a lower category cable may generally have a greater insertion loss than a higher category cable.

The local link partner 102 comprises a computer system 106a, a medium access control (MAC) controller 108a, and a transceiver 104a. The remote link partner 104 comprises a computer system 106b, a MAC controller 108b, and a transceiver 110b. Notwithstanding, the invention is not limited in this regard.

The transceiver 110a may comprise suitable logic, circuitry, and/or code that may enable communication, for example, transmission and reception of data, between the local link partner 102 and a link partner, such as the remote link partner 104, for example. Similarly, the transceiver 110b may comprise suitable logic, circuitry, and/or code that may enable communication between the remote link partner 104 and a link partner, such as the local link partner 102, for example. The transceivers 110a and 110b may support, for example, Ethernet operations. The transceivers 110a and 110b may enable multi-rate communications, such as 10 Mbps, 100 Mbps, 1000 Mbps (or 1 Gbps) and/or 10 Gbps, for example. In this regard, the transceivers 110a and 110b may support standard-based data rates and/or non-standard data rates. Moreover, the transceivers 110a and 110b may support standard Ethernet link lengths or ranges of operation and/or extended ranges of operation. The transceivers 110a and 110b may enable communication between the local link partner 102 and the remote link partner 104 by utilizing a link discovery signaling (LDS) operation that enables detection of active operations in the other link partner. In this regard the LDS operation may be adapted for supporting a standard Ethernet operation and/or an extended range Ethernet operation. Moreover, the transceivers 110a and 110b may enable an Ethernet line code operation that adapts the line code rate to support extended range operations.

The transceivers 110a and 110b may utilize multilevel signaling, for example. In this regard, the transceivers 110a and 110b may utilize pulse amplitude modulation (PAM) with various levels to represent the various symbols to be transmitted. For example, for 1000 Mbps Ethernet applications, a PAM-5 transmission scheme may be utilized in each twisted-pair wire, where PAM-5 refers to PAM with five levels $\{-2, -1, 0, 1, 2\}$. For Ethernet line code operations that support PAM-3, the PAM-3 transmission scheme may be utilized in each twisted-pair wire, where PAM-3 refers to PAM with three levels $\{-1, 0, 1\}$.

The data transmitted and/or received by the transceivers 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical (PHY) layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE codes that may be communicated between frames of data.

In the embodiment of the invention illustrated in FIG. 1, the computer systems 106a and 106b may represent layer 3 and above, the MAC controllers 108a and 108b may represent layer 2 and above and the transceivers 110a and 110b may represent the operability and/or functionality of layer 1 or the PHY layer. In this regard, the transceivers 110a and 110b may be referred to as PHY devices or PHY transceivers, for example. The computer systems 106a and 106b comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the computer systems 106a and 106b to ensure that packets are suitably formatted and communicated to the transceivers 110a and 110b. During transmission, each layer adds its own header to the data passed on from the interfacing layer above it. However, during reception, a compatible device having a similar OSI stack strips off the headers as the message passes from the lower layers up to the higher layers.

The transceivers 110a and 110b may be configured to handle all the physical layer requirements, which include, but are not limited to, packetization, data transfer and serialization/deserialization (SERDES), in instances where such an operation is required. Data packets received by the transceivers 110a and 110b from MAC controllers 108a and 108b, respectively, may include data and header information for each of the above six functional layers. The transceivers 110a and 110b may be configured to encode data packets that are to be transmitted over the cable 112 and/or to decode data packets received from the cable 112.

The MAC controller 108a comprises suitable logic, circuitry, and/or code that may enable handling of data link layer, layer 2, operability and/or functionality in the local link partner 102. Similarly, the MAC controller 108b comprises suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard. The MAC controller 108a may also enable generation of signals that may be utilized for aligning data in an Ethernet line code operation that supports extended cable or link range distances.

The MAC controller 108a may communicate with the transceiver 110a via an interface 114a and with the computer system 106a via a bus controller interface 116a. The MAC controller 108b may communicate with the transceiver 110b via an interface 114b and with the computer system 106b via a bus controller interface 116b. The interfaces 114a and 114b correspond to Ethernet interfaces that comprise protocol and/or link management control signals. The interfaces 114a and 114b may be multi-rate interfaces. The bus controller interfaces 116a and 116b may correspond to PCI or PCI-X interfaces. Notwithstanding, the invention is not limited in this regard.

Figure 2:
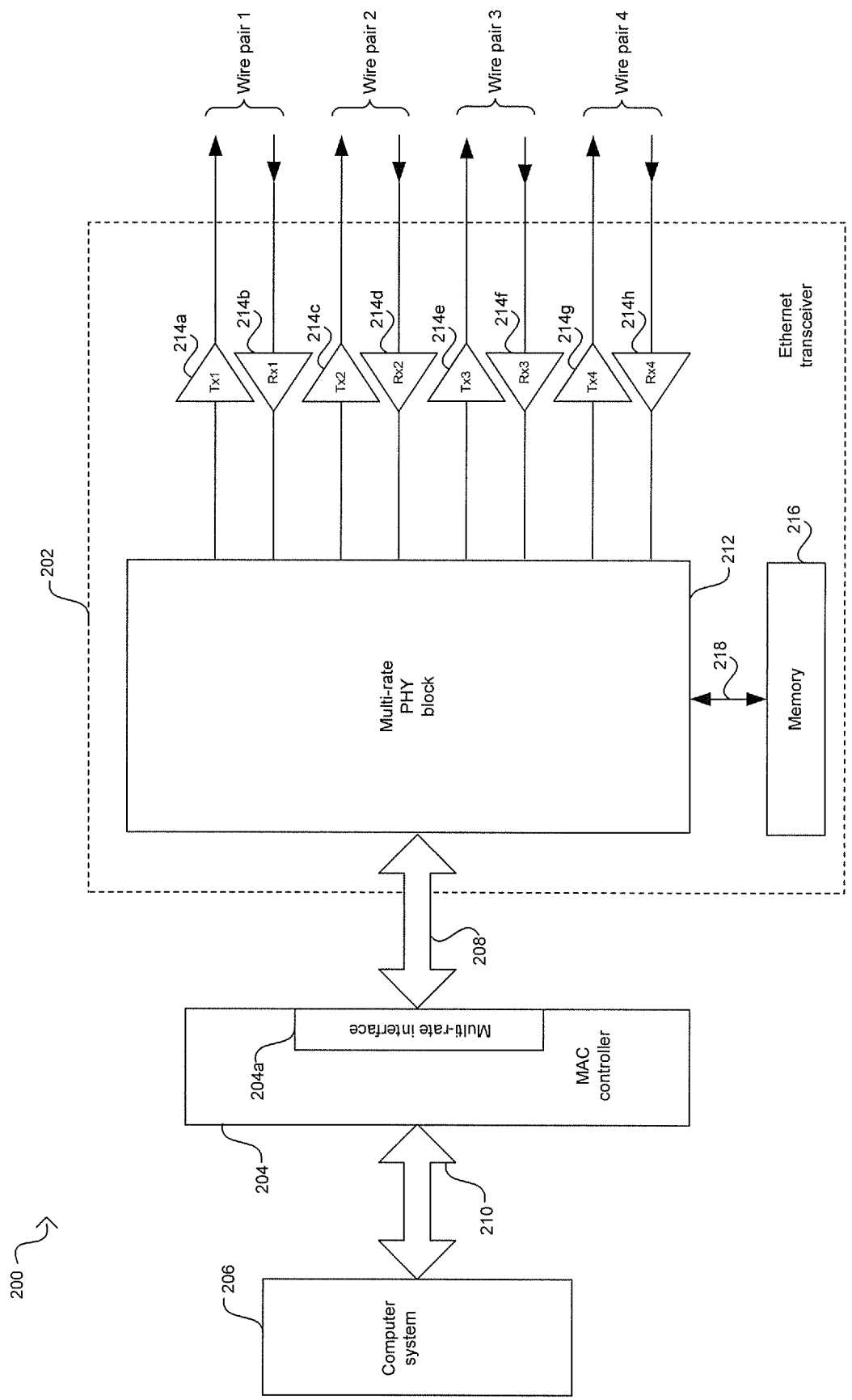
FIG. 2 is a block diagram illustrating an exemplary Ethernet transceiver multi-rate PHY layer architecture, in accordance with an embodiment of the invention.

FIG. 2 is a block diagram illustrating an exemplary Ethernet transceiver multi-rate PHY layer architecture, in accordance with an embodiment of the invention. Referring to FIG. 2, there is shown a link partner 200 that comprises a transceiver or PHY device 202, a MAC controller 204, a computer system 206, an interface 208, and a bus controller interface 210. The transceiver 202 may be an integrated device that comprises a multi-rate PHY block 212, a plurality of transmitters 214a, 214c, 214e, and 214g, a plurality of receivers 214b, 214d, 214f, and 214h, a memory 216, and a memory interface 218. The operation of the transceiver 202 may be the same as or substantially similar to that of the transceivers 110a and 110b disclosed in FIG. 1. In this regard, the transceiver 202 may provide layer 1 or PHY layer operability and/or functionality that enables communication with a remote PHY device. Similarly, the operation of the MAC controller 204, the computer system 206, the interface 208, and the bus controller 210 may be the same as or substantially similar to the respective MAC controllers 108a and 108b, computer systems 106a and 106b, interfaces 114a and 114b, and bus controller interfaces 116a and 116b as described in FIG. 1. The MAC controller 204 may comprise a multi-rate interface 204a that may comprise suitable logic, circuitry, and/or code to enable communication with the transceiver 202 at a plurality of data rates via the interface 208.

The multi-rate PHY block 212 in the transceiver 202 comprises suitable logic, circuitry, and/or code that may enable operability and/or functionality of PHY layer requirements. In this regard, the multi-rate PHY block 212 may enable generating the appropriate link discovery signaling utilized for establishing communication with a remote transceiver or PHY device in a remote link partner. Moreover, the multi-rate PHY block 212 may enable generating the appropriate Ethernet line code operation to support extended range applications. The multi-rate PHY block 212 communicates with the MAC controller 204 via the interface 208. In one aspect of the invention, the interface 208 may be configured to utilize a plurality of serial data lanes for receiving data from the multi-rate PHY block 212 and/or for transmitting data to the multi-rate PHY block 212, in order to achieve higher operational speeds such as Gbps or 10 Gbps, for example. The multi-rate PHY block 212 may be configured to operate in one or more of a plurality of communication modes, where each communication mode implements a different communication protocol. These communication modes may include, but are not limited to, IEEE 802.3, 10GBASE-T and other similar protocols. The multi-rate PHY block 212 may be configured to operate in a particular mode of operation upon initialization or during operation. The multi-rate PHY block 212 may also be configured to operate in an extended range mode.

In some instances, an auto-negotiation scheme may be utilized by the transceiver 202 to indicate or communicate to a remote link partner that the transceiver 202 is operating in an extended range mode. The auto-negotiation scheme may occur after or as a result of a link discovery signaling operation. The remote link partner may then configure itself to the appropriate extended range mode. Through standard auto-negotiation, a network link may be configured as an extended range from only one end of the link, ensuring interoperability between extended range enabled Ethernet transceivers and legacy devices. In this regard, the link discovery signaling may be adapted to enable establishing communication between extended range enabled Ethernet transceivers and legacy devices. In some instances, the link may be pre-configured and the transceivers fixed in an extended range mode.

The multi-rate PHY block 212 may be coupled to memory 216 through the memory interface 218, which may be implemented as a serial interface or a bus. The memory 216 comprises suitable logic, circuitry, and/or code that may enable storage or programming of information that includes parameters and/or code that may effectuate the operation of the multi-rate PHY block 212. The parameters may comprise configuration data and the code may comprise operational code such as software and/or firmware, but the information need not limited in this regard. Moreover, the parameters may include adaptive filter and/or block coefficients for use by the multi-rate PHY block 212, for example.

The transmitters 214a, 214c, 214e, and 214g may comprise suitable logic, circuitry, and/or code that may enable transmission of data from the link partner 200 to a remote link partner via the cable 212 in FIG. 1, for example. The receivers 214b, 214d, 214f, and 214h may comprise suitable logic, circuitry, and/or code that may enable receiving data from a remote link partner by the link partner 200. Each of the four pairs of transmitters and receivers in the transceiver 202 correspond to one of the four wires that may be comprised within the cable 212. For example, transceiver 214a and receiver 214b are utilized to communicate with a remote link partner via the first wire pair in the cable 212. Similarly, transceiver 214g and receiver 214h may be utilized to communicate with a remote link partner via the fourth wire pair in the cable 212. In this regard, at least one of the four transceiver/receiver pairs may be enabled to provide the appropriate communication rate. The link discovery signaling operation may enable communication in an extended range mode when at least one of the four twisted-pair wires is active.

Figure 3:
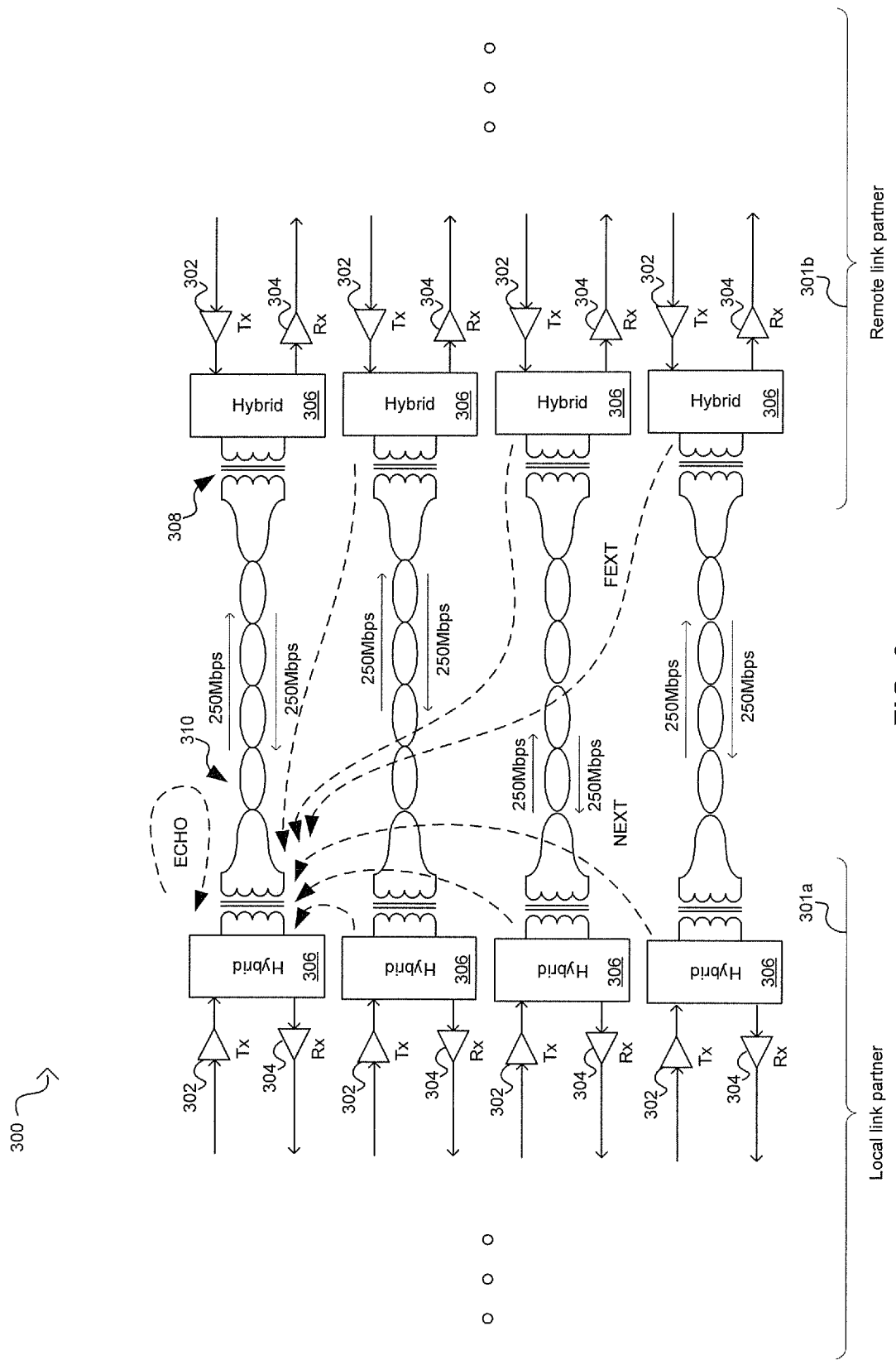
FIG. 3 is a block diagram illustrating ECHO, NEXT, and FEXT channel conditions in a Gigabit Ethernet system, in connection with an embodiment of the invention.

FIG. 3 is a block diagram illustrating ECHO, NEXT, and FEXT channel conditions in a Gigabit Ethernet system, in connection with an embodiment of the invention. Referring to FIG. 3, there is shown a Gigabit Ethernet system 300 that may comprise a local link partner 301a and a remote link partner 301b. The local link partner 301a and the remote link partner 301b may communicate via four twisted-pair wires 310 in full duplex operation. Each of the four twisted-pair wires 310 may support 250 Mbps data rates to provide an aggregate data rate of 1 Gbps. The local link partner 301a may comprise four hybrids 306. Each hybrid 306 in the local link partner 301a may be communicatively coupled to a transmitter 302, a receiver 304, and to one of the four twisted-pair wires 310. Similarly, the remote link partner 301b may comprise four hybrids 306. Each hybrid 306 in the remote link partner 301b may be communicatively coupled to a transmitter 302, a receiver 304, and to one of the four twisted-pair wires 310. The portions of the local link partner 301a and the remote link partner 301b shown in FIG. 3 may correspond to a portion of the physical (PHY) layer operations supported by the local link partner 301a and remote link partner 301b respectively.

Each hybrid 306 in the local link partner 301a or the remote link partner 301b may be communicatively coupled to or comprise a transformer 308. The hybrid 306 may comprise suitable logic, circuitry, and/or code that may enable separating the transmitted and received signals from a twisted-pair wire 310. The transmitters 302 may comprise suitable logic, circuitry, and/or code that may enable generating signals to be transmitted to a link partner at the other end of the link via a hybrid 306 and a twisted-pair wire 310. The receivers 304 may comprise suitable logic, circuitry, and/or code that may enable processing signals received from a link partner at the other end of the link via a twisted-pair wire 310 and a hybrid 306.

During operation, several conditions may occur in each of the twisted-pair wires 310. For example, intersymbol interference (ISI) may occur as a result of frequency dependent wire attenuation. As shown in FIG. 3, an ECHO component may be received in a twisted-pair wire 310 from an echo that results from the local transmitter 302 on the same twisted-pair wire 310. A near-end crosstalk (NEXT) component may also be received in a twisted-pair wire 310 from the local transmitters 302 corresponding to the three adjacent twisted-pair wires 310 in the same link partner. Moreover, a far-end crosstalk (FEXT) component may also be received in a twisted-pair wire 310 from the remote transmitters 302 in the link partner at the other end of the link. Notwithstanding the Gigabit Ethernet system 300 disclosed in FIG. 3, the invention need not be so limited.

Figure 4A:
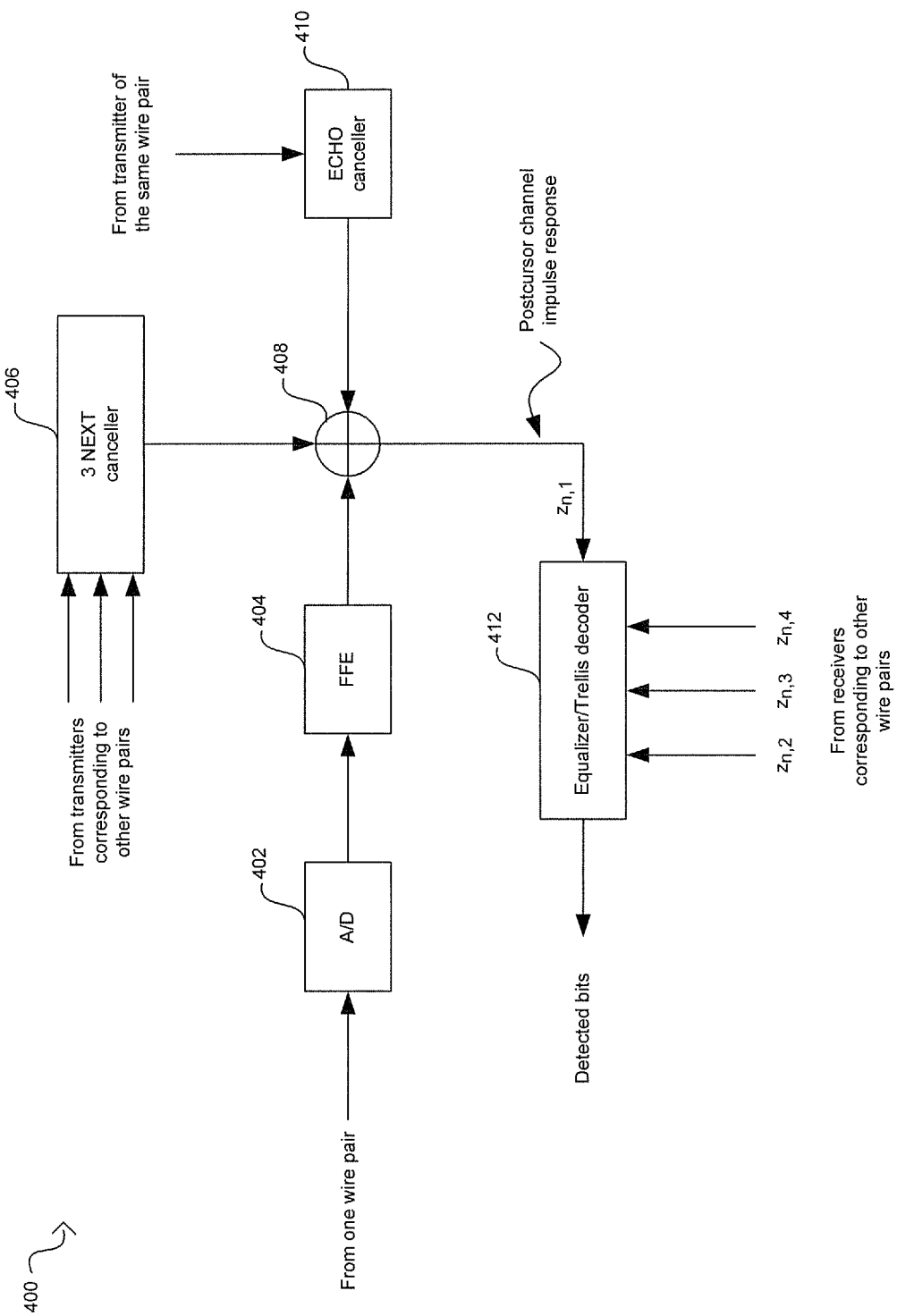
FIG. 4A is a block diagram illustrating exemplary signal processing operations on a received signal for Gigabit Ethernet, in connection with an embodiment of the invention.

FIG. 4A is a block diagram illustrating exemplary signal processing operations on a received signal for Gigabit Ethernet, in connection with an embodiment of the invention. Referring to FIG. 4A, there is shown a signal processing system 400 that may provide a portion of the signal processing performed by the PHY layer operations in an Ethernet transceiver. For example, the signal processing system 400 may be implemented in the multi-rate PHY block 212 and/or in the receivers 214b, 214d, 214f, and 214h in FIG. 2. The signal processing system 400 may comprise an analog-to-digital converter (A/D) 402, an adaptive feed-forward equalizer (FFE) 404, a 3 NEXT canceller 406, an adder 408, an ECHO canceller 410, and an equalizer/trellis decoder 412.

The A/D 402 may comprise suitable logic, circuitry, and/or code that may enable converting analog signals received via a twisted-pair wire into digital signals. The output of the A/D 402 may be communicated to the FFE 404. The FFE 404 may comprise suitable logic, circuitry, and/or code that may enable removal of precursor ISI to make the channel minimum-phase and to whiten the noise in the channel. The 3 NEXT canceller 406 may comprise suitable logic, circuitry, and/or code that may enable canceling at least a portion of the NEXT component received in the twisted-pair wire from the local transmitters corresponding to the three adjacent twisted-pair wires. The ECHO canceller 410 may comprise suitable logic, circuitry, and/or code that may enable canceling at least a portion of the ECHO component received in the twisted-pair wire from the local transmitter on the same twisted-pair wire.

The adder 408 may comprise suitable logic, circuitry, and/or code that may enable adding the output of the FFE 404, the 3 NEXT canceller 406, and/or the ECHO canceller to generate a postcursor channel impulse response, $z_{n,1}$. The equalizer/trellis decoder 412 may comprise suitable logic, circuitry and/or code that may enable equalizing the ISI that may result from the postcursor impulse response and decoding the trellis code. The equalizer/trellis decoder 412 may receive as inputs the postcursor channel impulse responses, $z_{n,2}$, $z_{n,3}$, and $z_{n,4}$ the corresponding to the other twisted-pair wires. The equalizer/trellis decoder 412 may generate the detected bits that correspond to the analog signal received.

Figure 4B:
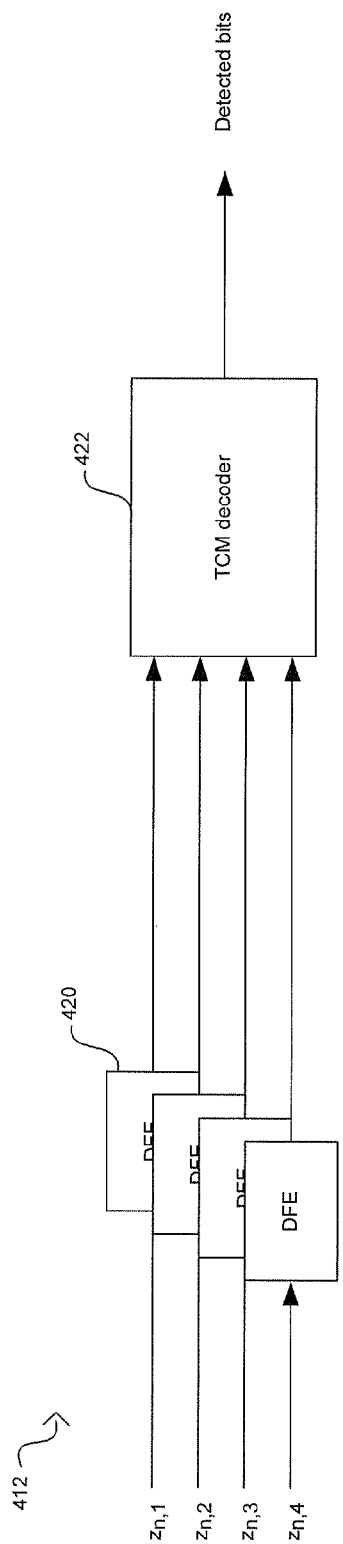
FIG. 4B is a block diagram illustrating exemplary separate equalization and decoding operations for Gigabit Ethernet as described in FIG. 4A, in connection with an embodiment of the invention.

FIG. 4B is a block diagram illustrating exemplary separate equalization and decoding operations for Gigabit Ethernet as described in FIG. 4A, in connection with an embodiment of the invention. Referring to FIG. 4B, there is shown the equalizer/trellis decoder 412 implemented as separate equalization and trellis decoding operations. The equalizer/trellis decoder 412 may comprise four decision-feedback equalizers (DFE) 420 and a trellis-coded modulation (TCM) decoder 422. The DFE 420 may comprise suitable logic, circuitry, and/or code that may enable removing the postcursor ISI for each twisted-pair wire. The TCM decoder 422 may comprise suitable logic, circuitry, and/or code that may enable executing a Viterbi algorithm on the code trellis to decode the trellis-coded symbols. The TCM decoder 422 may be implemented using a parallel decision-feedback decoding architecture, for example. The separate equalization and trellis decoding approach may provide low implementation complexity and the 1 Gbps data rate may be easily achieved.

Figure 4C:
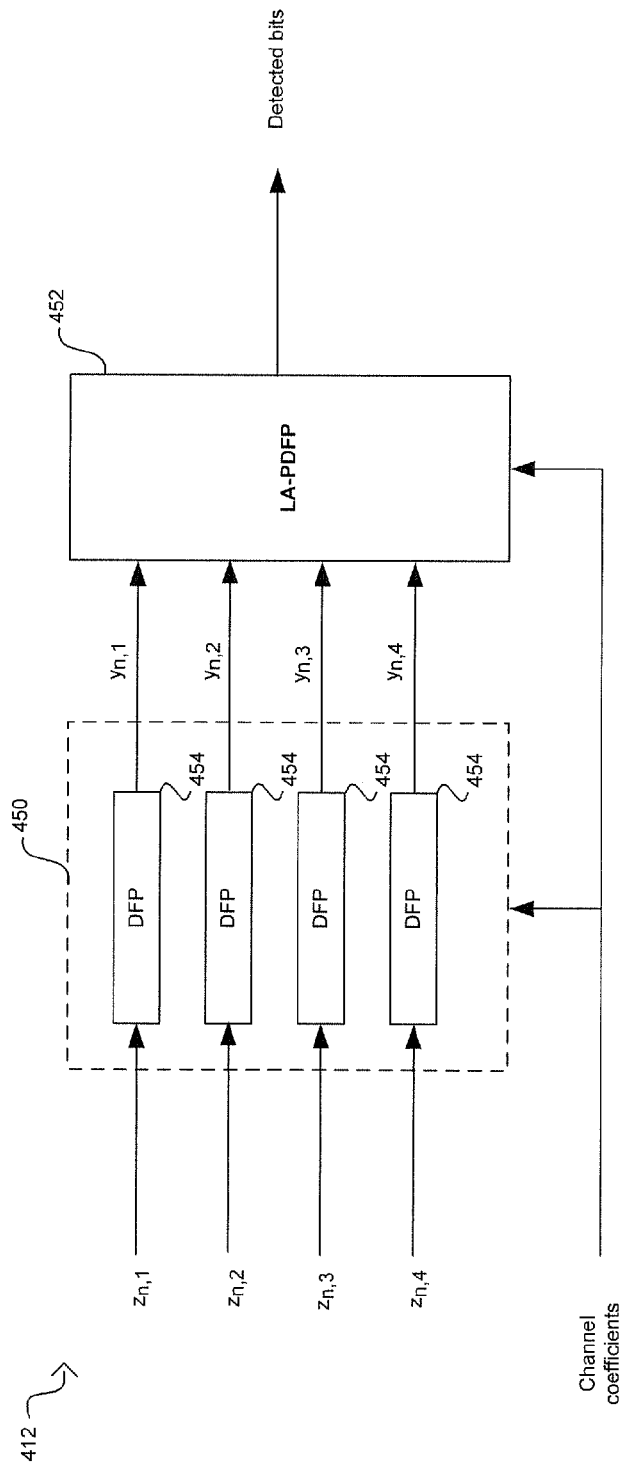
FIG. 4C is a block diagram illustrating exemplary joint equalization and decoding operations for Gigabit Ethernet as described in FIG. 4A, in connection with an embodiment of the invention.

FIG. 4C is a block diagram illustrating exemplary joint equalization and decoding operations for Gigabit Ethernet as described in FIG. 4A, in connection with an embodiment of the invention. Referring to FIG. 4C, there is shown the equalizer/trellis decoder 412 implemented as joint equalization and trellis decoding operations. The equalizer/trellis decoder 412 may comprise a decision-feedback prefilter (DFP) block 450 and a look-ahead parallel decision-feedback decoder (LA-PDFD) 452. The DFP block 450 may comprise four DFPs 454, one for each twisted-pair wire. The DFP 454 may comprise suitable logic, circuitry, and/or code that may enable shortening the postcursor channel memory. The LA-PDFP 452 may comprise suitable logic, circuitry, and/or code that may enable computing branch metrics in a look-ahead fashion. The training and adaptation of the channel coefficients may be utilized to improve the performance of the equalizer/trellis decoder 412 in FIG. 4D.

Figure 5A:
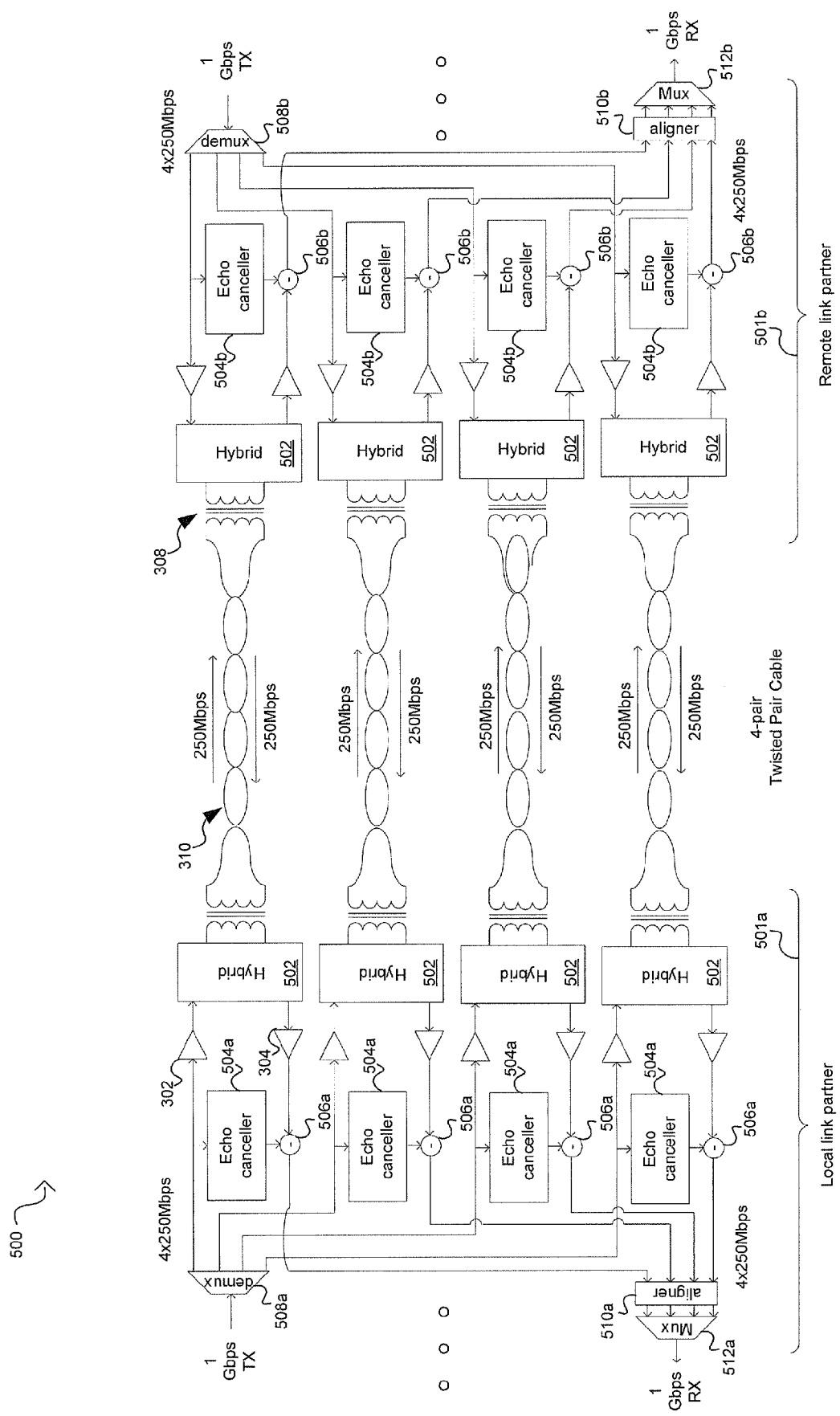
FIG. 5A is a block diagram of an exemplary Ethernet connection operating at 1000 Mbps over four-pair twisted-pair cabling, in connection with an embodiment of the invention.

FIG. 5A is a block diagram of an exemplary Ethernet connection operating at 1000 Mbps over four-pair twisted-pair cabling, in connection with an embodiment of the invention. Referring to FIG. 5A, there is shown an Ethernet system 500 operating at 1000 Mbps, or Gbps, that may comprise a local link partner 501a and a remote link partner 501b. The local link partner 501a and the remote link partner 501b may communicate via up to four active twisted-pair wires 310 in full duplex operation. Each of the four twisted-pair wires 310 may support 250 Mbps data rates to provide an aggregate data rate of 1 Gbps when all four twisted-pair wires are active. In some instances, either one or two of the twisted-pair wires 310 may be active, in which case the data rates supported by the Ethernet system 500 may be 250 Mbps and 500 Mbps respectively. The local link partner 501a may comprise four hybrids 502. The operation of the hybrid 502 may be the same or substantially similar to the operation of the hybrid 302 in FIG. 3. Notwithstanding, the invention is not so limited and may support various implementations of a hybrid circuitry. Each hybrid 502 in the local link partner 501a may be communicatively coupled to a transmitter 302, a receiver 304, and to one of the four twisted-pair wires 310. Associated with each hybrid 502 in the local link partner 501a are also an echo canceller 504a and a subtractor 506a. The local link partner 501a may also comprise a demultiplexer (demux) 508a, an aligner 510a, and a multiplexer (mux) 512a.

Similarly, the remote link partner 501b may comprise four hybrids 502. Each hybrid 502 in the remote link partner 501b may be communicatively coupled to a transmitter 302, a receiver 304, and to one of the four twisted-pair wires 310. Associated with each hybrid 502 in the remote link partner 501b are also an echo canceller 504b and a subtractor 506b. The remote link partner 501b may also comprise a demux 508b, an aligner 510b, and a mux 512b. The portions of the local link partner 501a and remote link partner 501b shown in FIG. 5A may correspond to a portion of the physical (PHY) layer operations supported by the local link partner 501a and remote link partner 501b respectively.

The demuxes 508a and 508b may comprise suitable logic, circuitry, and/or code that may enable separating a 1 Gbps signal into four 250 Mbps signals for transmission over the four twisted-pair wires. The aligners 510a and 510b may comprise suitable logic, circuitry, and/or code that may enable aligning the 250 Mbps signals received from each of the four twisted-pair wires. The muxes 512a and 512b may comprise suitable logic, circuitry, and/or code that may enable combining the aligned 250 Mbps signals from the aligner 510 to generate a 1 Gbps received signal.

The echo cancellers 504a and 504b may comprise suitable logic, circuitry, and/or code that may enable processing the signal to be transmitted via a transmitter 302 to at least partially cancel the ECHO component in the corresponding signal received via the receiver 304 associated with the same twisted-pair wire. The subtractors 506a and 506b may comprise suitable logic, circuitry, and/or code that may enable canceling the ECHO component from the received signal.

In operation, the local link partner 501b may separate a 1 Gbps signal to be transmitted into four 250 Mbps signals via the demux 508a. Each signal to be transmitted is processed by a transmitter 302 before being communicated to the corresponding twisted-pair wire via a hybrid 502. The four transmitted signals may arrive at the remote link partner 501b where each may be processed by a receiver 304 before echo cancellation occurs from the operation of a corresponding echo canceller 504b and subtractor 506b. The four received 250 Mbps signals may be aligned in the aligner 510b before being combined in the mux 512b into a 1 Gbps received signal.

Similarly, the remote link partner 501b may separate a 1 Gbps signal to be transmitted into four 250 Mbps signals via the demux 508b. Each signal to be transmitted may be processed by a transmitter 302 before being communicated to the corresponding twisted-pair wire via a hybrid 502. The four transmitted signals may arrive at the local link partner 501a where each may be processed by a receiver 304 before echo cancellation occurs from the operation of a corresponding echo canceller 504a and subtractor 506a. The four received 250 Mbps signals may be aligned in the aligner 510a before being combined in the mux 512a into a 1 Gbps received signal.

Figure 5B:
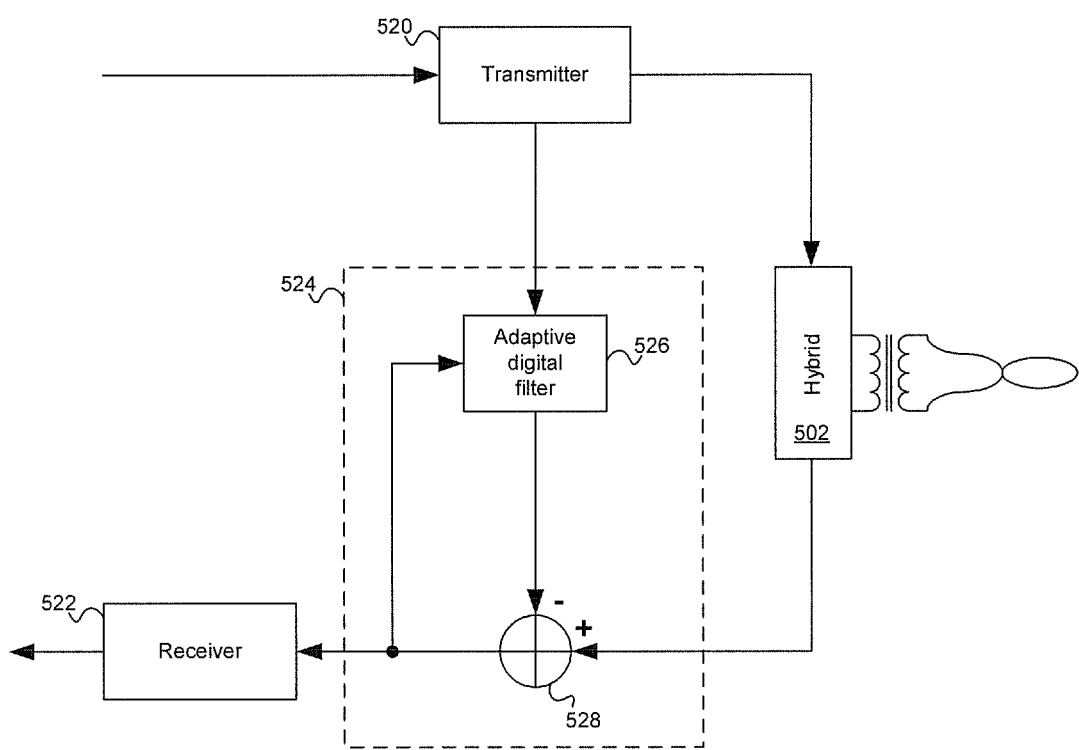
FIG. 5B is a block diagram of an exemplary echo canceller in a multi-rate PHY, in connection with an embodiment of the invention.

FIG. 5B is a block diagram of an exemplary echo canceller in a multi-rate PHY, in connection with an embodiment of the invention. Referring to FIG. 5B, there is shown an echo cancellation portion of a PHY layer operation for Gbps or 10 Gbps modes that comprises a transmitter 520, a receiver 522, a hybrid 502, and an echo cancellation block 524. The echo cancellation block 524 may comprise an adaptive digital filter 526 and a subtractor 528. The transmitter 520 may comprise suitable logic, circuitry, and/or code that may enable generating signals to be transmitted to a link partner at the other end of the link via the hybrid 502 and a corresponding twisted-pair wire. In this regard, the transmitter 520 may be utilized for transmitting signals associated with a link discovery signaling operation, for example. The receiver 522 may comprise suitable logic, circuitry, and/or code that may enable processing of echo-cancelled signals received from a link partner at the other end of the link via a corresponding twisted-pair wire and the hybrid 502. In this regard, the receiver 522 may be utilized for receiving signals associated with a link discovery signaling operation, for example.

The adaptive digital filter 526 may comprise suitable logic, circuitry, and/or code that may enable at least partial cancellation of the ECHO component of a received signal. In this regard, the adaptive digital filter 526 may utilize information regarding the transmitted and the received signals. The adaptive digital filter 526 may be an adaptive transversal digital filter that may implement a correlation algorithm, a stochastic iteration algorithm, and/or a sign algorithm, for example.

In operation, a signal may be received via the hybrid 502. The adaptive digital filter 526 may utilize information regarding signals being transmitted via the transmitter 520 to determine a noise component associated with the ECHO component to subtract from the received signal at the subtractor 528. The output of the subtractor 528 may be communicated to the receiver 522 and to the adaptive digital filter 526 to perform iterative echo cancellation operations.

Figure 6:
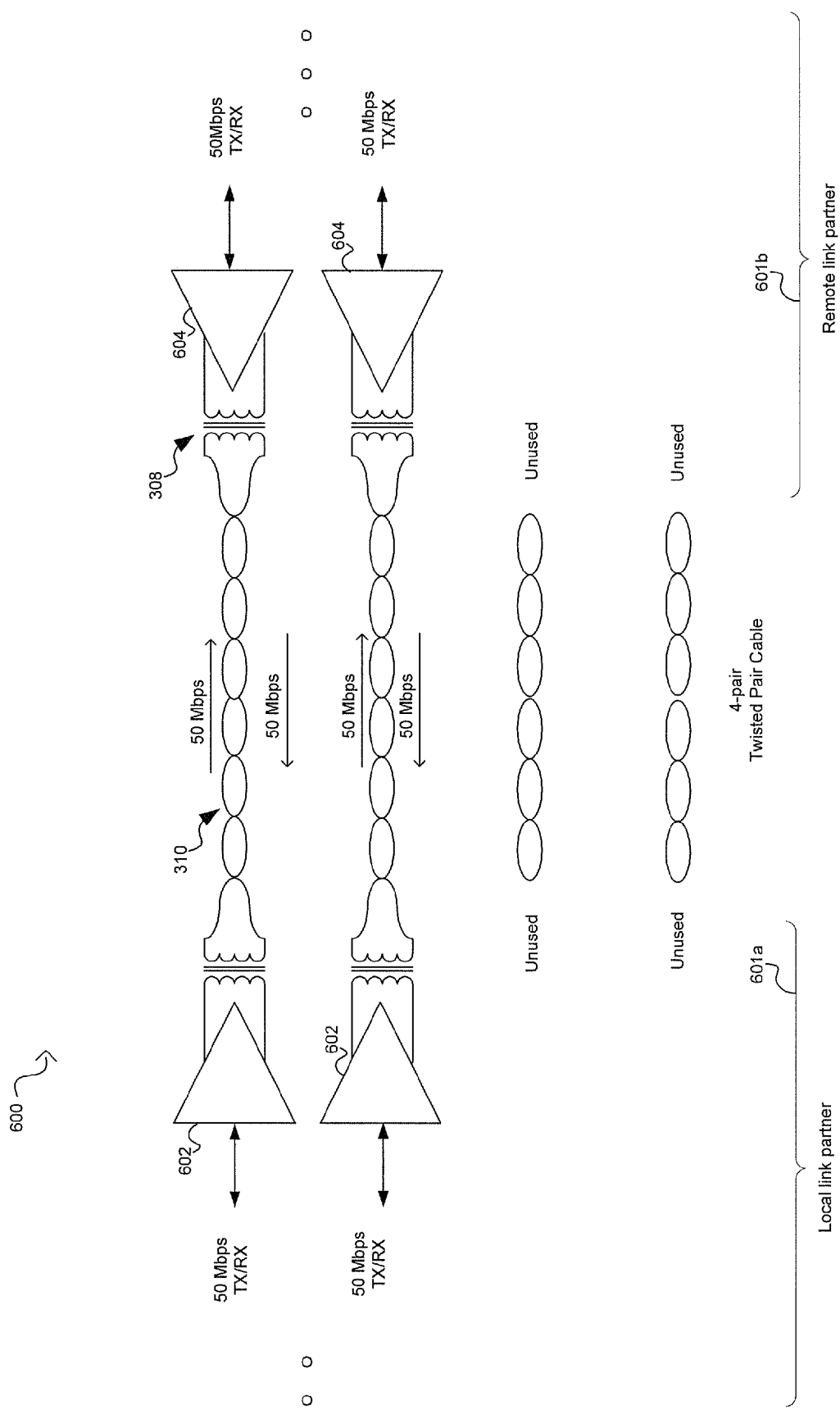
FIG. 6 is a block diagram of an exemplary full duplex Ethernet connection operating at 100 Mbps over a two-pair twisted-pair cabling, in accordance with an embodiment of the invention.

FIG. 6 is a block diagram of an exemplary full duplex Ethernet connection operating at 100 Mbps over a two-pair twisted-pair cabling, in accordance with an embodiment of the invention. Referring to FIG. 6, there is shown an Ethernet system 600 operating at full duplex, 100 Mbps. The Ethernet system 600 may comprise a local link partner 601a and a remote link partner 601b. The local link partner 601a and the remote link partner 601b may communicate via two twisted-pair wires 310, wherein each twisted-pair wire is operating at full duplex, 50 Mbps. Transmission and reception operations may be performed over each twisted-pair wire. In this exemplary embodiment, the two additional twisted-pair wires are shown as being unused. With each of the twisted-pair wires 310 in use supporting full duplex 50 Mbps data rates, the overall communication rate is 100 Mbps. The local link partner 601a may comprise PHY transceivers 602. The remote link partner 601b may comprise PHY transceivers 604.

The PHY transceivers 602 and 604 may comprise suitable logic, circuitry, and/or code that may enable transmission over a twisted-pair wire. The PHY transceivers 602 and 604 may, in some instances, transmit via a transformer 308 communicatively coupled to the transmitters. The PHY transceivers 602 and 604 may also enable receiving signals from a twisted-pair wire. The PHY transceivers 602 and 604 may, in some instances, receive signals via a transformer 308 communicatively coupled to the receivers.

Extended range applications may be supported when at least one twisted-pair wire is active. Moreover, extended range applications may also be supported in active twisted-pair wire connections operation in a single direction or in a full duplex connection as shown in FIG. 6. To enable extended range applications, the PHY or local transceiver may need to provide the appropriate Ethernet line code operation.

Figure 7:
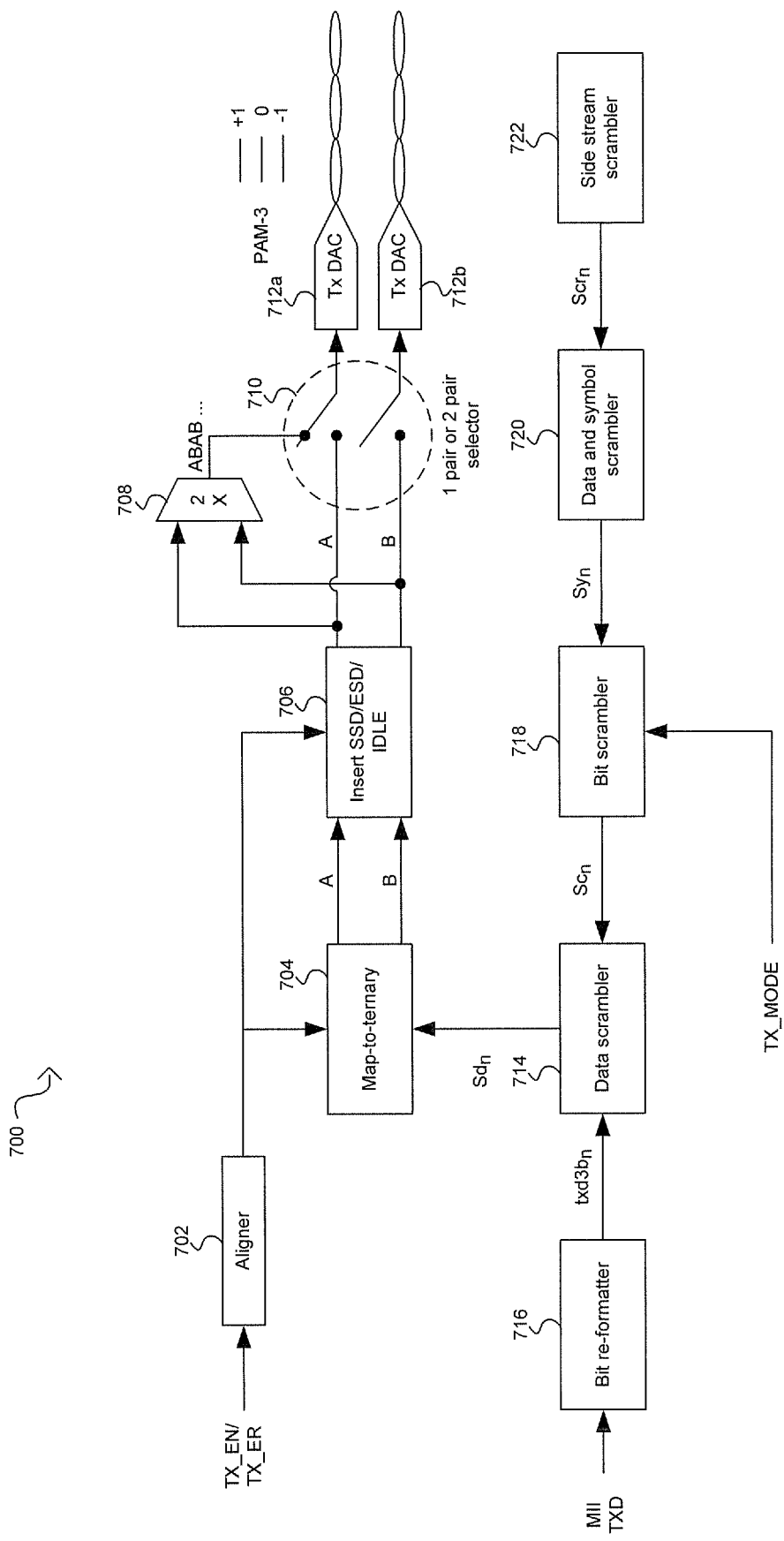
FIG. 7 is a block diagram illustrating generation of an exemplary extended range Ethernet line code, in accordance with an embodiment of the invention.

FIG. 7 is a block diagram illustrating generation of an exemplary extended range Ethernet line code, in accordance with an embodiment of the invention. Referring to FIG. 7, there is shown an Ethernet line code system 700 that may comprise an aligner 702, a map-to-ternary block 704, an insert SSD/ESD/IDLE block 706, a multiplexer 708, a switch 710, a first transmitter 712a, a second transmitter 712b, a data scrambler 714, a bit re-formatter 716, a bit scrambler 718, a data and symbol scrambler 720, and a side stream scrambler 722.

The side stream scrambler 722 may comprise suitable logic, circuitry, and/or code that may be utilized to generate a stream of side scrambling values, $Scr_n$, which may be communicated to the data and symbol scrambler 720. In this regard, the side stream scrambler 722 may utilize for extended range applications a substantially similar sidestream scrambling operation as that utilized in 1 Gigabit Ethernet PHYs. For example, when the PHY is operating as a master device, the master scrambler polynomial utilized by the side stream scrambler 722 to generate the side scrambling values, $Scr_n$, may be $g_M(x)=1+x^{13}+x^{33}$. When the PHY is operating as a slave device, the slave scrambler polynomial utilized by the side stream scrambler 722 to generate the side scrambling values, $Scr_n$, may be $g_s(x)=1+x^{20}+x^{33}$, for example.

The data and symbol scrambler 720 may comprise suitable logic, circuitry, and/or code that may enable receiving the stream of side scrambling values, $Scr_n$, from the side stream scrambler 722 and generating a stream of data and symbol scrambling values, $Sy_n$. In an exemplary embodiment of the invention, the data and symbol scrambling values, $Sy_n$, may be 3-bit values. The following exemplary expression may be utilized by the data and symbol scrambler 720 to generate the data and symbol scrambling value, $Sy_n$:

$g(x)=X^3\ X^8$, $Sy_n[0]=Scr_n[0]$, $Sy_n[1]=g(Scr_n[0])=Scr_n[3]\ ^\wedge Scr_n[8]$, and $Sy_n[2]=g2(Scr_n[0])=Scr_n[6]\ ^\wedge Scr_n[16]$.

The bit scrambler 718 may comprise suitable logic, circuitry, and/or code that may enable receiving a stream of data and symbol scrambling values, $Sy_n$, from the data and symbol scrambler 720 and generating a stream of scrambler bit values, $Sc_n$. In an exemplary embodiment of the invention, the scrambler bit values, $Sc_n$, may be 3-bit values. The following exemplary expression may be utilized by the bit scrambler 718 to generate the scrambler bit stream, $Sc_n$:

$$Sc_n[2:1] = \begin{cases} [0\ 0] & \text{if } (tx\_mode = SEND\_Z) \\ Sy_n[2:1] & \text{else if } (n-n0) = 0(\text{mod}2) \\ (Sy_{n-1}[2:1]^\wedge[1\ 1]) & \text{else} \end{cases}$$

and $$Sc_n[0] = \begin{cases} 0 & \text{if } (tx\_mode = SEND\_Z) \\ Sy_n[0] & \text{else} \end{cases}$$

where the signal tx_mode may be received by the bit scrambler 718 from another portion of the local PHY and/or from a MAC layer device, for example.

The bit re-formatter 716 may comprise suitable logic, circuitry, and/or code that may enable receiving a stream of MII data for transmission, MII TXD, and converting the stream of 4-bit MII data packets into a stream of 3-bit MII data packets, $txd3b_n$, which may be communicated to the data scrambler 714. The data scrambler 714 may comprise suitable logic, circuitry, and/or code that may enable receiving a stream of scrambler bits values, $Sc_n$, from the bits scrambler 718 and the stream of converted 3-bit MII data packets, $txd3b_n$, and generating a stream of data scrambler values, $Sd_n$. In an exemplary embodiment of the invention, the data scrambler values, $Sd_n$, may be 3-bit values. The following exemplary expression may be utilized by the data scrambler 714 to generate the data scrambler values, $Sd_n$:

$$Sd_n[2] = \begin{cases} Sc_n[2]^\wedge txd3b_n[2] & \text{if } (tx\_enable_{n-3} = 1) \\ Sc_n[2]^\wedge 1 & \text{else if } (loc\_rcvr\_status = OK) \\ Sc_n[2] & \text{else} \end{cases}$$

and $$Sd_n[1:0] = \begin{cases} Sc_n[1:0]^\wedge txd3b_n[1:0] & \text{if } (tx\_enable_{n-3} = 1) \\ Sc_n[1:0] & \text{else} \end{cases}$$

where $tx\_enable_{n-3}$ may be a signal that refers to a transmit enable status and loc_rcvr_status may be a signal that refers to a current status of a local receiver, for example.

The aligner 702 may comprise suitable logic, circuitry, and/or code that may enable generating at least one alignment signal from a transmit enable (TX_EN) and/or a transmit error (TX_ER) signal to compensate for misalignments resulting from the Ethernet line code operation. For example, since the number of bits of MII data may not always be a multiple of 3, after the 4-bit to 3-bit conversion, the transmitter may align the MII TXD data to a 3-bit boundary by, for example, padding either 1 or 2 bits at the end of the data stream before inserting ESD ternary bits {0,0}, {0,0} and {1,1}. At the receiver's end, the received binary bits from converting the ternary symbols eventually may get converted back into 4-bit MII receiver (RXD) data. Since the decoded data stream may be aligned to 4-bits boundary, there may remain 1 or 2 additional bits before the ternary symbol {0,0} that may not be aligned to 4-bit boundary, and those bits may be truncated at the receiver. The aligner 702 may communicate the at least one alignment signal to the map-to-ternary block 704 and/or to the insert SSD/ESD/IDLE block 706.

The map-to-ternary block 704 may comprise suitable logic, circuitry, and/or code that may enable generating a first stream of ternary bits, A, and a second stream of ternary bits, B, based on the stream of data scrambler values, $Sd_n$, generated by the data scrambler 714 and in accordance with the at least one alignment signal generated by the aligner 702. The ternary bits A and B utilized to represent the 3-bit data scrambler values may result in 9 possible results where 8 of the possible results may be sufficient to fully represent the data scramble values as shown in Table 1. In this regard, the result provided by the ternary bits {0, 0} may be utilized in control codes to indicate start or end of the stream, and/or to transmit and error, for example.

For IDLE codes or patterns, the mapping to ternary bits may be implemented somewhat differently. The sequence of IDLE patterns may have to be randomized and the content of the IDLE may be utilized to synchronize a descrambler in the remote device's receiver with the local device's descrambler. During an IDLE state, 3-bit binary IDLE patterns may be generated by the side stream scrambler 722. When the least significant bit of IDLE pattern is '0', one of the ternary bits, such as the ternary bit A, for example, may be assigned a non-zero ternary value, such as '−1' or '1'. Otherwise, when the least significant bit of the IDLE pattern is '1', the appropriate ternary bit may be assigned the ternary value of '0'. Such a rule or approach may enable the descrambler on the receiver's side to synchronize with the scrambler stream by converting the received symbol corresponding to the ternary bit A into a binary bit and feeding the converted value into the descrambler shift registers.

TABLE 1

Binary to ternary bit mapping during data transmission.

| Sdn[2:0] | Ternary A | Ternary B |
|---|---|---|
| 0 | −1 | −1 |
| 1 | −1 | 0 |
| 2 | −1 | 1 |
| 3 | 0 | −1 |
| Undefined | 0 | 0 |
| 4 | 0 | 1 |
| 5 | 1 | −1 |
| 6 | 1 | 0 |
| 7 | 1 | 1 |

A similar or substantially similar rule or approach may be utilized to identify which of the twisted-pair wires may be carrying the ternary bit A. In this regard, a trial and error mechanism may be utilized. For example, when the bit '0' of descrambler eventually matches with incoming symbol, the ternary bit A may have been identified. Such an approach may also resolve any ternary bit or ternary symbol alignment issues that may arise from the ordering, whether AB or BA, when sending both ternary bits A and B over single pair of twisted-pair wires.

When transmitting IDLE codes or patterns, the mapping of the data scrambler values, $Sd_n$, comprising the IDLE information may require 6 ternary bits or ternary symbols as illustrated in Table 2. In an embodiment of the invention, the ternary symbols {0, 0}, {−1, −1} and {1, 1} need not be utilized during IDLE code transmission.

TABLE 2

Binary to ternary bit mapping during IDLE transmission.

| Sdn[2:0] | Ternary A | Ternary B |
|---|---|---|
| 000 | −1 | 0 |
| 001 | 0 | 1 |

TABLE 2-continued

Binary to ternary bit mapping during IDLE transmission.

| Sdn[2:0] | Ternary A | Ternary B |
|---|---|---|
| 010 | −1 | 1 |
| 011 | 0 | 1 |
| 100 | 1 | 0 |
| 101 | 0 | −1 |
| 110 | 1 | −1 |
| 111 | 0 | −1 |

The insert SSD/ESD/IDLE block 706 may comprise suitable logic, circuitry, and/or code that may be utilized to insert start-stream delimiters (SSD), end-stream delimiters (ESD), an error code, xmt_error, and/or IDLE codes to the stream of information to be transmitted from the PHY device. In this regard, the insert SSD/ESD/IDLE block 706 may receive the ternary bits A and B generated by the map-to-ternary block 704 and may insert the appropriate codes in accordance with the at least one alignment signal generated by the aligner 702. In this regard, the three (3) control codes, SSD, ESD and xmt_error, may be noticeable among the data and the IDLE stream. For example, the ternary bits or symbols {0,0} {0,0} {1,1} may be utilized as the ESD delimiter, the ternary bits or symbols {0,0} {0,0} {0,0} may be utilized as the SSD delimiter, and the ternary bits or symbols {0,0} {0,0} {−1,−1} may be utilized to indicate a transmission error or xmt_error. When the TX_ER signal is asserted while the TX_EN is also asserted, the ESD may be replaced with the ternary bits or symbols {0,0}, {0,0}, and {−1, −1} to indicate that the previous packet has a transmission error. When the receiver is detecting these symbols, the receiver may assert an RX_ER signal before de-asserting an RX_DV signal, for example.

The transmitters 712a and 712b may comprise suitable logic, circuitry, and/or code that may be utilized to transmit the ternary bits via a twisted-pair wire to a remote link partner. In some instances, the stream comprising ternary bits A and the stream comprising ternary bits B may be transmitted via separate transmitters. In other instances, the stream of ternary bits A and the stream of ternary bits B may be combined and may be transmitted via a single transmitter. In this regard, the multiplexer 708 may comprise suitable logic, circuitry, and/or code that may enable generating a single stream that comprises the contents of the stream comprising ternary bits A and the contents of the stream comprising ternary bits B. The output of the multiplexer 708 may be ordered with the ternary bits A first, for example, ABABABA . . . , or with the ternary bits B first, for example, BABABAB . . . . Notwithstanding, a single stream may comprise more than two combined streams of ternary bits or symbols. The switch 710 may comprise suitable logic, circuitry, and/or code that may enable selection of transmission of the single stream of ternary bits A and B generated by the multiplexer 708 or the transmission of separate streams for ternary bits A and B. In this regard, when a single stream is to be transmitted, the switch 710 may enable selection of transmission via the transmitter 712a or via the transmitter 712b. When a combined single stream is transmitted, the operation of the corresponding transmitter may be at twice the rate, for example.

Figure 8:
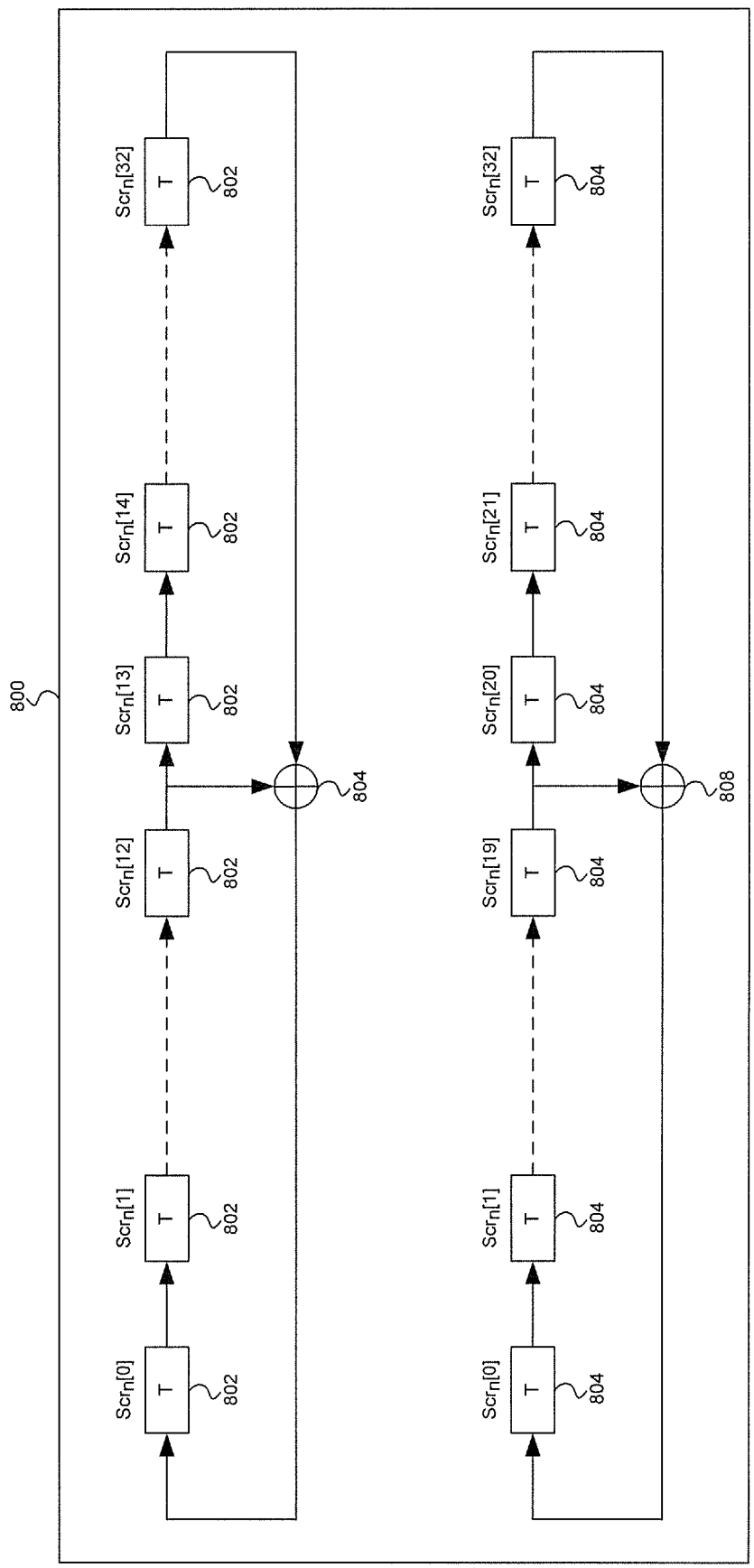
FIG. 8 is a block diagram illustrating an exemplary side stream scrambler, in accordance with an embodiment of the invention.

FIG. 8 is a block diagram illustrating an exemplary side stream scrambler, in accordance with an embodiment of the invention. Referring to FIG. 8, there is shown a side stream scrambler 800 that may correspond to the side stream scrambler 722 disclosed in FIG. 7. The side stream scrambler 800 may be utilized for generation of a master scrambler polynomial when the PHY device operates as a master device or for generation of a slave scrambler polynomial when the PHY device operates as a slave device. In this regard, the upper portion of the side stream scrambler 800 may correspond to logic, circuitry, and/or code that may be utilized to implement the master scrambler polynomial as disclosed in FIG. 7, for example. The upper portion of the side stream scrambler 800 may comprise a plurality of delays 802 and an adder 804 that may be utilized for generation of $Scr_n[0], \ldots, Scr_n[12], \ldots,$ and $Scr_n[32]$, for use in the master scrambler polynomial. Moreover, the lower portion of the side stream scrambler 800 may correspond to logic, circuitry, and/or code that may be utilized to implement the slave scrambler polynomial as disclosed in FIG. 7, for example. The lower portion of the side stream scrambler 800 may comprise a plurality of delays 804 and an adder 808 that may be utilized for generation of $Scr_n[0], \ldots, Scr_n[19], \ldots,$ and $Scr_n[32]$, for use in the slave scrambler polynomial.

Figure 9:
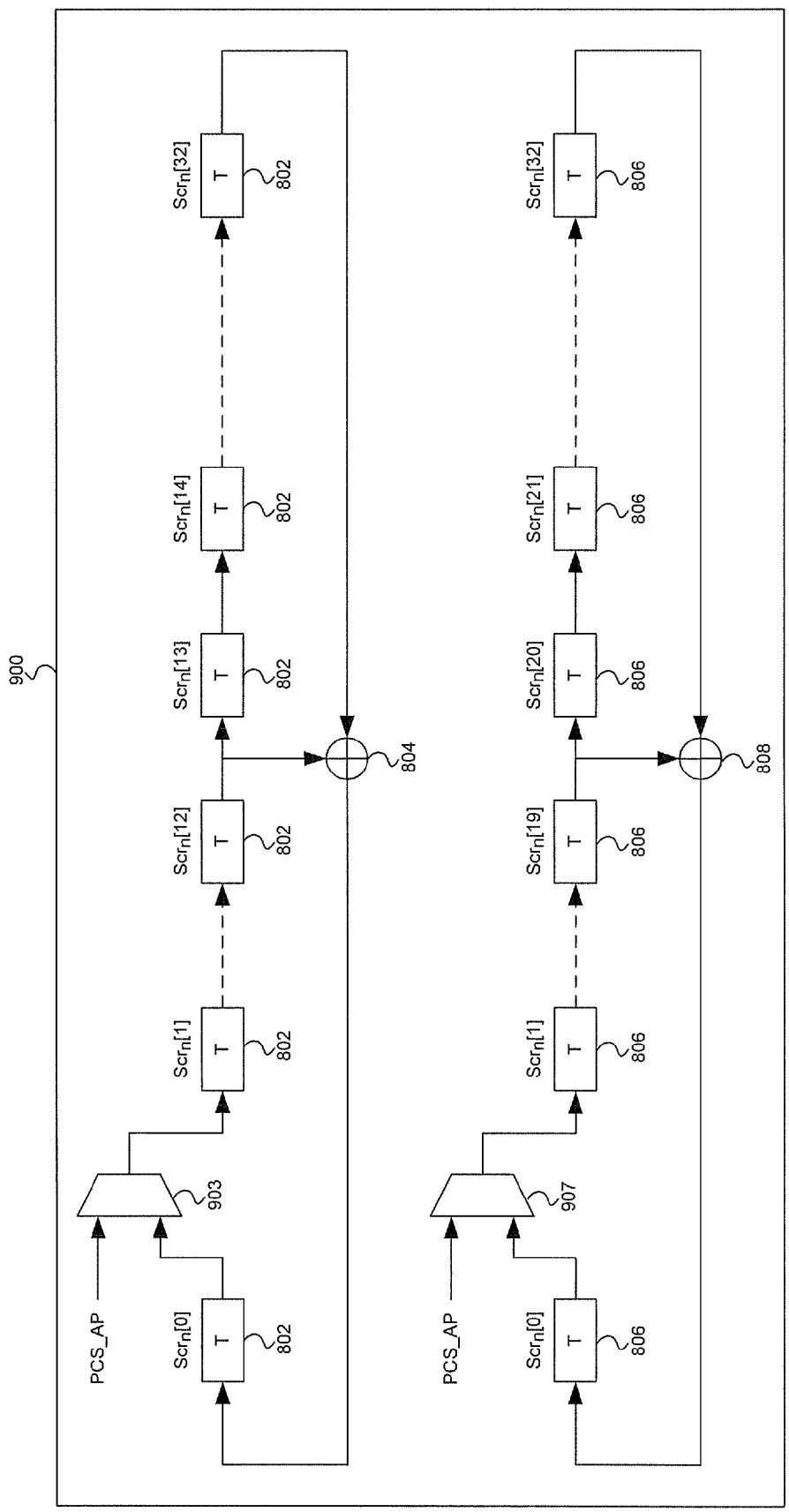
FIG. 9 is a block diagram illustrating an exemplary side stream descrambler, in accordance with an embodiment of the invention.

FIG. 9 is a block diagram illustrating an exemplary side stream descrambler, in accordance with an embodiment of the invention. Referring to FIG. 9, there is shown a side stream descrambler 900 that may be utilized by a receiver to descramble data scrambled with data generated by the side stream scrambler 722 disclosed in FIG. 7. The side stream descrambler 900 may be utilized for generation of a master descrambler polynomial when the receiver PHY device operates as a master device or for generation of a slave scrambler polynomial when the receiver PHY device operates as a slave device. In this regard, the upper portion of the side stream descrambler 900 may correspond to logic, circuitry, and/or code that may be utilized to implement the master descrambler polynomial that corresponds to the master scrambler polynomial disclosed in FIG. 7, for example. The upper portion of the side stream descrambler 900 may comprise a selector 903, a plurality of delays 802, and an adder 804 that may be utilized for generation of $Scr_n[0], \ldots, Scr_n[12], \ldots,$ and $Scr_n[32]$, for use in the master descrambler polynomial. The input signal PCS_AP to the selector 903 is '1' when the corresponding ternary symbol is '0'.

Moreover, the lower portion of the side stream descrambler 900 may correspond to logic, circuitry, and/or code that may be utilized to implement the slave descrambler polynomial that corresponds to the slave scrambler polynomial as disclosed in FIG. 7, for example. The lower portion of the side stream descrambler 900 may comprise a selector 903, a plurality of delays 804, and an adder 808 that may be utilized for generation of $Scr_n[0], \ldots, Scr_n[19], \ldots,$ and $Scr_n[32]$, for use in the slave descrambler polynomial. In this regard, the selectors 903 and 907 may have substantially similar operations.

Figures 10, 11:
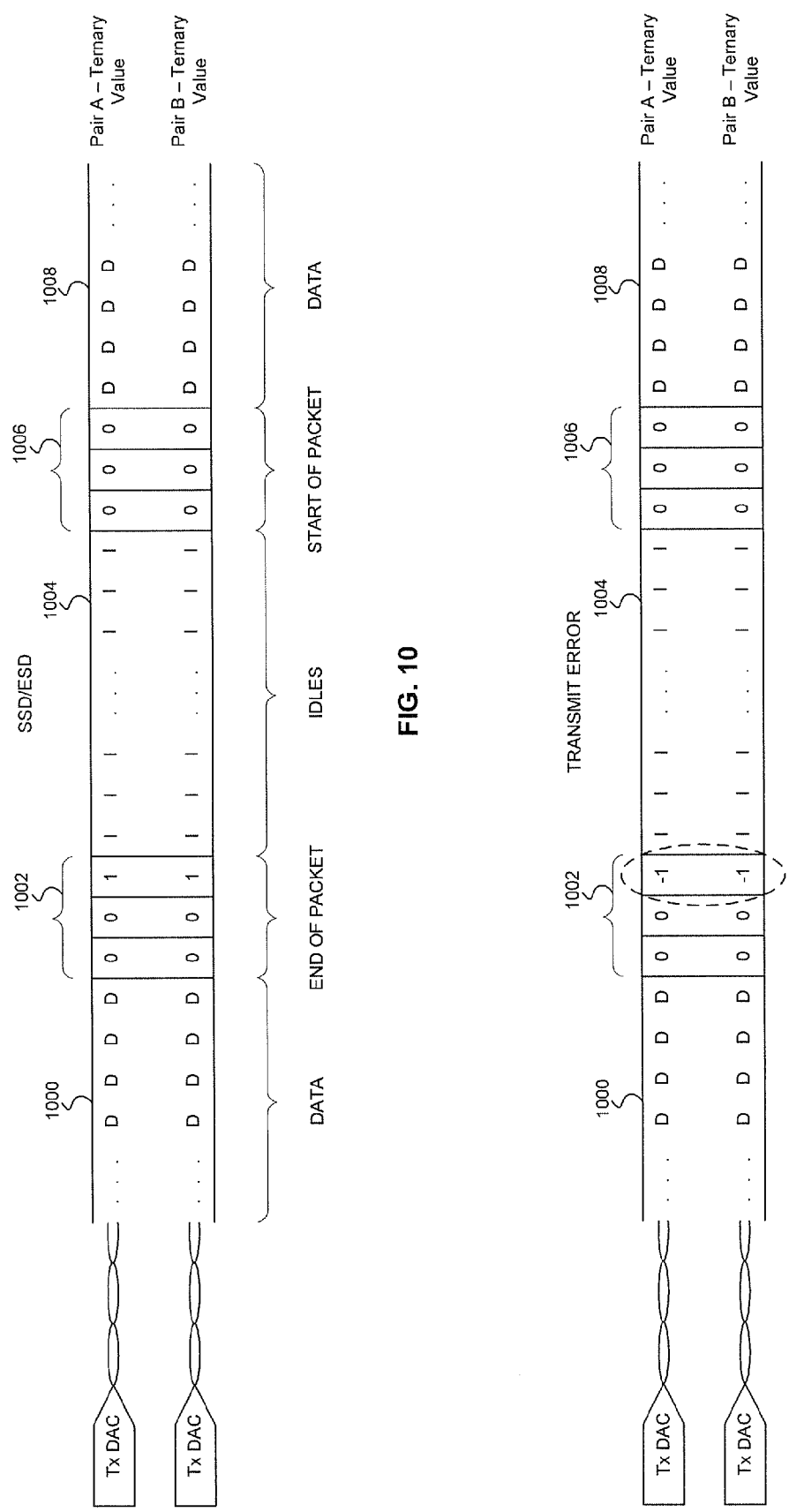
FIG. 10 is a block diagram illustrating exemplary SSD/ESD codes in a transmission stream, in accordance with an embodiment of the invention.
FIG. 11 is a block diagram illustrating exemplary transmit error, in accordance with an embodiment of the invention.

FIG. 10 is a block diagram illustrating exemplary SSD/ESD codes in a transmission stream, in accordance with an embodiment of the invention. Referring to FIG. 10, there is shown a pair of streams being transmitted over separate twisted-pair wires that correspond to a ternary bit A stream and to a ternary bit B stream. Each stream comprises a data packet portion 1000, an end of packet 1002, an IDLE code portion 1004, a start of packet 1006, and a next data packet portion 1008. The data packet portion 1000 and the next data packet portion 1008 correspond to consecutive frames of PAM-3 MII data being transmitted over two twisted-pair wires. The end of packet 1002 may correspond to an end-stream delimiter (ESD) which indicates the end of the data packet portion 1000. The sequence of ternary symbols {0,0,1} in the ESD may indicate a prior transmission without errors. The IDLE code portion 1000 may correspond to a sequence of idle codes transmitted between consecutive data frames. The start of packet 1006 may correspond to a start-stream delimiter (SSD) which indicates the start or beginning of the data packet portion 1008. The sequence of ternary symbols {0,0,0} in the SSD may indicate the start of the next data frame. Notwithstanding the use of SSD and/or ESD codes disclosed in FIG. 10, the invention is not limited in this regard. Moreover, a similar stream structure may be utilized when a combined stream comprising both the ternary bit A and the ternary bit B is communicated via a single twisted-pair wire.

FIG. 11 is a block diagram illustrating exemplary transmit error, in accordance with an embodiment of the invention. Referring to FIG. 11, there is shown the pair of streams being transmitted over separate twisted-pair wires corresponding to the ternary bit A stream and to the ternary bit B stream as disclosed in FIG. 10. In this exemplary embodiment, the end of packet 1002 utilizes a sequence of ternary symbols {0,0,−1} that may indicate to a receiver that a prior transmission error has occurred. Notwithstanding the use of a transmission error code in the ESD as disclosed in FIG. 11, the invention is not limited in this regard. Moreover, a similar stream structure may be utilized when a combined stream comprising both the ternary bit A and the ternary bit B is communicated via a single twisted-pair wire.

Figure 12:
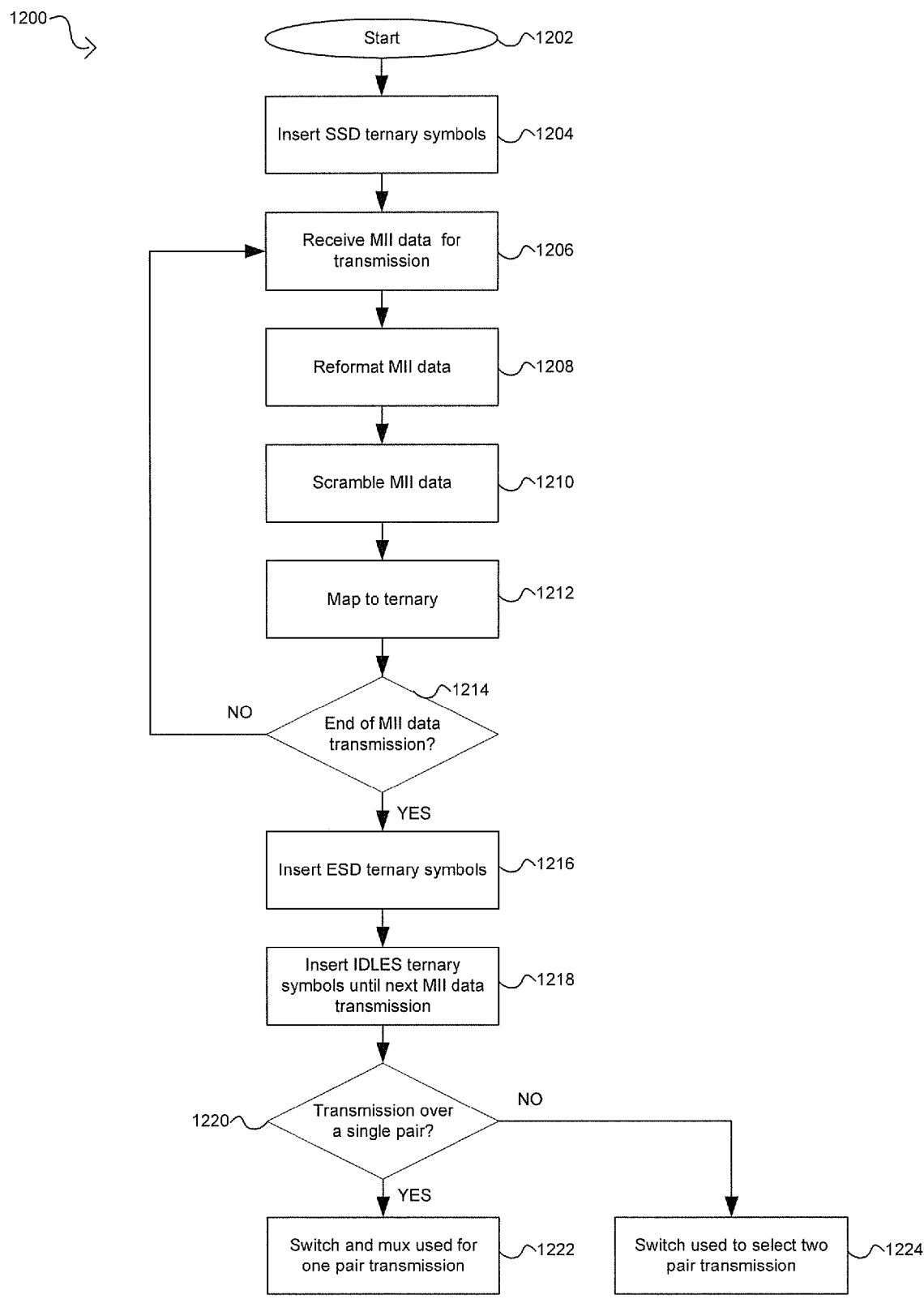
FIG. 12 is a flow diagram illustrating exemplary steps for extended range Ethernet line code operation, in accordance with an embodiment of the invention.

FIG. 12 is a flow diagram illustrating exemplary steps for extended range Ethernet line code operation, in accordance with an embodiment of the invention. Referring to FIG. 12, there is shown a flow diagram 1200 illustrating the operations of the Ethernet line code for extended range operations as disclosed in FIGS. 7-11. In step 1204, after start step 1202, before transmission of the Mil data stream, the insert SSD/ESD/IDLE block 706 may insert the start-stream delimiter (SSD) to indicate that a new frame of data is to be transmitted. In step 1206, the bit re-formatter 716 may receive MII TXD data for transmission. In step 1208, the bit re-formatter 716 may convert the 4-bit MII data packet from the Mil TXD stream into 3-bit data packets that may be communicated to the data scrambler 714. In step 1210, the 3-bit data packets from the bit re-formatter 716 may be scrambled in the data scrambler 714 based on the results of operations performed by the bit scrambler 718, the data and symbol scrambler 720, and/or the side stream scrambler 722. In step 1212, the map-to-ternary block 704 may be utilized to map the stream of scrambled data values generated by the data scrambler 714 to two ternary bits A and B as disclosed in Table 1, for example. The stream of ternary bits A and B generated from the mapping of the scrambled data values may be transmitted after the insertion of the SSD in step 1206.

In step 1214, when the MII TXD data to be transmitted in the current frame has been received and processed for transmission, the process may proceed to step 1216. In step 1216, the insert SSD/ESD/IDLE block 706 may insert the end-stream delimiter (ESD) to indicate that the end of the data frame has been transmitted. The ESD may also indicate whether an error with the transmission has occurred. In step 1218, after the ESD is inserted the IDLE codes may be generated, mapped to ternary bits, and inserted into the transmission stream as disclosed in FIGS. 7-11. Returning to step 1214, when the MII TXD data to be transmitted in the current frame has not been completely received and processed for transmission, the process may return to step 1206.

In step 1220, when the transmission is to occur over a single twisted-pair wire, the process may proceed to step 1222. In step 1222, the multiplexer 708 may be enabled for combining the ternary bits streams and the switch 710 may enable transmission of the single stream of ternary bits A and B over one of the transmitters 712a and 712b. Returning to step 1220, when the transmission is to occur over two twisted-pair wires, the process may proceed to step 1224. In step 1224, the switch 710 and multiplexer 708 may be in their normal mode of operation and may enable transmission of the streams of ternary bits A and B over the transmitters 712*a* and 712*b*.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
    generating one or more ternary encoded bitstreams, wherein said generating comprises mapping 3-bit binary IDLE patterns having a least significant bit of zero to a non-zero ternary value; and
    transmitting said generated one or more ternary encoded bitstreams over one or more physical channels;
    wherein said generating and said transmitting are performed by an Ethernet PHY that is configurable into at least two modes of operation, wherein:
        while operating in a first mode of operation, said Ethernet PHY communicates in accordance with 10BASE-T, 100BASE-T, 1000BASE-T, or 10 GBASE-T standards; and
        while operating in a second mode of operation, said Ethernet PHY performs said generating and said transmitting of said one or more ternary encoded bitstreams.

2. The method according to claim 1, wherein said generating comprises mapping 3-bit binary IDLE patterns having a non-zero least significant bit to a ternary zero.

3. The method according to claim 1, comprising:
    multiplexing two of said ternary encoded bitstreams into a single ternary encoded bitstreams; and
    transmitting said single ternary encoded bitstream over a single physical channel.

4. The method according to claim 1, wherein said generating of said ternary encoded bitstreams comprises:
    receiving binary data via a media independent interface;
    mapping each 4-bit portion of said received binary data to a ternary symbol comprising two ternary bits; and
    transmitting said ternary symbol over said one or more physical channels.

5. A method for communication, the method comprising:
    generating one or more ternary encoded bitstreams, wherein said generating comprises mapping 3-bit binary IDLE patterns having a non-zero least significant bit to a ternary zero; and
    transmitting said generated one or more ternary encoded bitstreams over one or more physical channels;
    wherein said generating and said transmitting are performed by an Ethernet PHY that is configurable into at least two modes of operation, wherein:
        while operating in a first mode of operation, said Ethernet PHY communicates in accordance with 10BASE-T, 100BASE-T, 1000BASE-T, or 10GBASE-T standards; and
        while operating in a second mode of operation, said Ethernet PHY performs said generating and said transmitting of said one or more ternary encoded bitstreams.

6. The method according to claim 5, wherein said generating comprises mapping 3-bit binary IDLE patterns having a least significant bit of zero to a non-zero ternary value.

7. The method according to claim 5, comprising:
    multiplexing two of said ternary encoded bitstreams into a single ternary encoded bitstreams; and
    transmitting said single ternary encoded bitstream over a single physical channel.

8. The method according to claim 5, wherein said generating of said ternary encoded bitstreams comprises:
    receiving binary data via a media-independent interface;
    mapping each 4-bit portion of said received binary data to a ternary symbol comprising two ternary bits; and
    transmitting said ternary symbol over said one or more physical channels.

9. A method for communication, the method comprising:
    generating one or more ternary encoded bitstreams; and
    transmitting said one or more ternary encoded bitstreams over one or more physical channels, wherein:
        data portions of said one or more ternary encoded bitstreams are generated by mapping 3-bit binary patterns to 2-bit ternary symbols; and
        one of the nine possible 2-bit ternary symbols is reserved for control portions of said one or more ternary encoded bitstreams;
    wherein said control portions of said ternary encoded bitstreams comprise a sequence of three of said 2-bit ternary symbols, and wherein each of a first two symbols of said sequence of three of said 2-bit ternary symbols comprises said symbol that is reserved, and a third symbol of said sequence indicates a control code being transmitted.

10. The method according to claim 9, wherein said control portions of said ternary encoded bitstreams comprise start of stream delimiters, end of stream delimiters, error indications, or any combination thereof.

11. A method for communication, the method comprising:
    generating one or more ternary encoded bitstreams; and
    transmitting said one or more ternary encoded bitstreams over one or more physical channels, wherein:

data portions of said one or more ternary encoded bitstreams are generated by mapping 3-bit binary patterns to 2-bit ternary symbols; and
one of the nine possible 2-bit ternary symbols is reserved for control portions of said one or more ternary encoded bitstreams;
wherein said generating and said transmitting are performed by an Ethernet PHY that is configurable into at least two modes of operation, wherein:
while operating in a first mode of operation, said Ethernet PHY communicates in accordance with 10BASE-T, 100BASE-T, 1000BASE-T, or 10GBASE-T standards; and
while operating in a second mode of operation, said Ethernet PHY performs said generating and said transmitting of said one or more ternary encoded bitstreams.

12. A system for communication, the system comprising:
one or more circuits and/or processors for use in an Ethernet PHY, said one or more circuits and/or processors being operable to:
generate one or more ternary encoded bitstreams, wherein said generation of said one or more ternary encoded bitstreams comprises mapping 3-bit binary IDLE patterns having a least significant bit of zero to a non-zero ternary value; and
transmit said generated one or more ternary encoded bitstreams over one or more physical channels;
wherein said Ethernet PHY is configurable into at least two modes of operation, wherein:
while operating in a first mode of operation, said one or more circuits and/or processors are operable to communicate in accordance with 10BASE-T, 100BASE-T, 1000BASE-T, or 10GBASE-T standards; and
while operating in a second mode of operation, said one or more circuits and/or processors are operable to perform said generation and said transmission of said one or more ternary encoded bitstreams.

13. The system according to claim 12, wherein said generation of said one or more ternary encoded bitstreams comprises mapping 3-bit binary IDLE patterns having a non-zero least significant bit to a ternary zero.

14. The system according to claim 12, wherein said one or more circuits and/or processors are operable to:
multiplex two of said ternary encoded bitstreams into a single ternary encoded bitstreams; and
transmit said single ternary encoded bitstream over a single physical channel.

15. The system according to claim 12, wherein said generation of said ternary encoded bitstreams comprises:
receiving binary data via a media independent interface;
mapping each 4-bit portion of said received binary data to a ternary symbol comprising two ternary bits; and
transmitting said ternary symbol over said one or more physical channels.

16. A system for communication, the system comprising:
one or more circuits and/or processors for use in an Ethernet PHY, said one or more circuits and/or processors being operable to:
generate one or more ternary encoded bitstreams, wherein said generation of said one or more ternary encoded bitstreams comprises mapping 3-bit binary IDLE patterns having a non-zero least significant bit to a ternary zero; and
transmit said generated one or more ternary encoded bitstreams over one or more physical channels;
wherein said Ethernet PHY is configurable into at least two modes of operation, wherein:
while operating in a first mode of operation, said one or more circuits and/or processors are operable to communicate in accordance with 10BASE-T, 100BASE-T, 1000BASE-T, or 10GBASE-T standards; and
while operating in a second mode of operation, said one or more circuits and/or processors are operable to perform said generation and said transmission of said one or more ternary encoded bitstreams.

17. The method according to claim 16, wherein said generation of said one or more ternary encoded bitstreams comprises mapping 3-bit binary IDLE patterns having a least significant bit of zero to a non-zero ternary value.

18. The system according to claim 16, wherein said one or more circuits and/or processors are operable to: multiplex two of said ternary encoded bitstreams into a single ternary encoded bitstreams; and transmit said single ternary encoded bitstream over a single physical channel.

19. The system according to claim 16, wherein said generation of said ternary encoded bitstreams comprises:
receiving binary data via a media independent interface;
mapping each 4-bit portion of said received binary data to a ternary symbol comprising two ternary bits; and
transmitting said ternary symbol over said one or more physical channels.

20. A system for communication, the system comprising:
one or more circuits and/or processors for use in an Ethernet PHY, said one or more circuits and/or processors being operable to:
generate one or more ternary encoded bitstreams; and
transmit said one or more ternary encoded bitstreams over one or more physical channels, wherein:
data portions of said one or more ternary encoded bitstreams are generated by mapping 3-bit binary patterns to 2-bit ternary symbols; and
one of the nine possible 2-bit ternary symbols is reserved for control portions of said one or more ternary encoded bitstreams;
wherein said control portions of said ternary encoded bitstreams comprise a sequence of three of said 2-bit ternary symbols, and wherein each of a first two symbols of said sequence of three of said 2-bit ternary symbols comprises said symbol that is reserved, and a third symbol of said sequence indicates control code being transmitted.

21. The system according to claim 20, wherein said control portions of said ternary encoded bitstreams comprise start of stream delimiters, end of stream delimiters, error indications, or any combination thereof.

22. A system for communication, the system comprising:
one or more circuits and/or processors for use in an Ethernet PHY, said one or more circuits and/or processors being operable to:
generate one or more ternary encoded bitstreams; and
transmit said one or more ternary encoded bitstreams over one or more physical channels, wherein:
data portions of said one or more ternary encoded bitstreams are generated by mapping 3-bit binary patterns to 2-bit ternary symbols; and
one of the nine possible 2-bit ternary symbols is reserved for control portions of said one or more ternary encoded bitstreams;
wherein said Ethernet PHY is configurable into at least two modes of operation, wherein:
while operating in a first mode of operation, said one or more circuits and/or processors are operable to communicate in accordance with 10BASE-T, 100BASE-T, 1000BASE-T, or 10GBASE-T standards; and
while operating in a second mode of operation, said one or more circuits and/or processors are operable to perform said generation and said transmission of said one or more ternary encoded bitstreams.

* * * * *